US011063652B2

(12) United States Patent
Xiong et al.

(10) Patent No.: US 11,063,652 B2
(45) Date of Patent: Jul. 13, 2021

(54) TECHNIQUES FOR IMPROVED BEAM MANAGEMENT

(71) Applicant: Apple Inc., Cupertino, CA (US)

(72) Inventors: Gang Xiong, Portland, OR (US); Yushu Zhang, Beijing (CN); Alexei Davydov, Nizhny Novgorod (RU); Wook Bong Lee, Pleasanton, CA (US); Dae Won Lee, Portland, OR (US); Guotong Wang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/487,155

(22) PCT Filed: Mar. 5, 2018

(86) PCT No.: PCT/US2018/020909
§ 371 (c)(1),
(2) Date: Aug. 20, 2019

(87) PCT Pub. No.: WO2018/165018
PCT Pub. Date: Sep. 13, 2018

(65) Prior Publication Data
US 2020/0059286 A1 Feb. 20, 2020

(30) Foreign Application Priority Data

Mar. 7, 2017 (WO) ............... PCT/CN2017/075848
Mar. 22, 2017 (WO) ............... PCT/CN2017/077716

(51) Int. Cl.
*H04B 7/06* (2006.01)
*H04B 1/7143* (2011.01)
(Continued)

(52) U.S. Cl.
CPC ......... *H04B 7/0695* (2013.01); *H04B 1/7143* (2013.01); *H04B 7/0413* (2013.01);
(Continued)

(58) Field of Classification Search
CPC .. H04B 7/0695; H04B 7/0413; H04B 7/0857; H04B 7/088; H04B 1/7143;
(Continued)

(56) References Cited

U.S. PATENT DOCUMENTS 9,363,004 B2 * 6/2016 Kis ........................ G01S 3/04
9,391,818 B1 * 7/2016 Rao ...................... H04L 25/022
(Continued)

FOREIGN PATENT DOCUMENTS

WO 2013/170209 A1 11/2013

OTHER PUBLICATIONS

International Preliminary Report on Patentability dated Sep. 20, 2019 for International Application No. PCT/US2018/020909.
(Continued)

*Primary Examiner* — James M Perez
(74) *Attorney, Agent, or Firm* — Eschweiler & Potashnik, LLC

(57) ABSTRACT

Techniques discussed herein can facilitate maintenance and/or recovery of BPL(s) (Beam Pair Link(s)). Various embodiments can employ aspects discussed herein can one or more of enable interference randomization for beam/link recovery signal(s) or reduce the overhead of UL (Uplink) beam management RS (Reference Signal(s)). Various embodiments can comprise UE(s) (User Equipment(s)) that can receive configuration signaling configuring the UE(s) to one or more of apply interference randomization to a beam/link recovery signal and/or generate a SR (Scheduling Request) channel for beam maintenance having reduced overhead and can transmit the beam/link recovery signal and/or SR channel. Additional embodiments can comprise gNB(s) (next Generation NodeB(s)) that can configure UE(s) for beam maintenance and/or recovery techniques discussed herein.

12 Claims, 17 Drawing Sheets

(51) Int. Cl.
| | |
|---|---|
| *H04B 7/0413* | (2017.01) |
| *H04B 7/08* | (2006.01) |
| *H04J 13/00* | (2011.01) |
| *H04L 5/00* | (2006.01) |
| *H04W 48/16* | (2009.01) |
| *H04W 72/04* | (2009.01) |
| *H04W 72/08* | (2009.01) |
| *H04B 1/715* | (2011.01) |

(52) U.S. Cl.
CPC ........... *H04B 7/088* (2013.01); *H04B 7/0857* (2013.01); *H04J 13/0074* (2013.01); *H04L 5/0094* (2013.01); *H04W 48/16* (2013.01); *H04W 72/0406* (2013.01); *H04W 72/082* (2013.01); *H04B 2001/7154* (2013.01)

(58) Field of Classification Search
CPC ......... H04B 2001/7154; H04J 13/0074; H04L 5/0094; H04W 48/16; H04W 72/0406; H04W 72/082
See application file for complete search history.

(56) References Cited

U.S. PATENT DOCUMENTS

| | | | | |
|---|---|---|---|---|
| 9,549,387 | B2* | 1/2017 | Chong | H04B 15/02 |
| 9,628,119 | B2* | 4/2017 | Gal | H03F 1/3241 |
| 9,973,370 | B1* | 5/2018 | Langer | H04W 52/365 |
| 10,390,313 | B2* | 8/2019 | Narang | H04W 52/283 |
| 10,419,200 | B2* | 9/2019 | Takahashi | H04L 7/065 |
| 10,439,663 | B2* | 10/2019 | Islam | H04L 1/0009 |
| 10,461,979 | B2* | 10/2019 | Pawar | H04L 27/2611 |
| 10,491,288 | B2* | 11/2019 | Zhu | H04B 7/0617 |
| 10,581,495 | B2* | 3/2020 | Tomala | H04L 69/323 |
| 10,659,123 | B2* | 5/2020 | Lee | H04B 7/0626 |
| 10,666,346 | B2* | 5/2020 | Bergstrom | H04B 7/0617 |
| 10,687,323 | B2* | 6/2020 | Jung | H04L 1/00 |
| 10,868,772 | B2* | 12/2020 | Zhang | H04L 41/0677 |
| 10,880,915 | B2* | 12/2020 | Lee | H04L 5/00 |
| 10,892,808 | B2* | 1/2021 | Kakishima | H04B 7/0626 |
| 10,924,175 | B2* | 2/2021 | Wang | H04W 72/046 |
| 10,925,116 | B2* | 2/2021 | Zhang | H04L 25/0226 |
| 2009/0221314 | A1* | 9/2009 | Hu | H04W 16/28 455/507 |
| 2013/0301439 | A1* | 11/2013 | Heo | H04W 56/001 370/252 |
| 2014/0269460 | A1* | 9/2014 | Papasakellariou | H04L 5/0048 370/294 |
| 2015/0381220 | A1* | 12/2015 | Gal | H04B 1/0475 375/296 |
| 2017/0048717 | A1* | 2/2017 | Yoo | H04L 5/1469 |
| 2017/0264409 | A1* | 9/2017 | Guo | H04L 5/0073 |
| 2018/0131426 | A1* | 5/2018 | Lee | H04B 7/0695 |
| 2018/0145822 | A1* | 5/2018 | Takahashi | H04L 25/38 |
| 2018/0159668 | A1* | 6/2018 | Phuyal | H04L 1/1896 |
| 2018/0167897 | A1* | 6/2018 | Sampath | H04W 52/365 |
| 2018/0176903 | A1* | 6/2018 | Lee | H04L 1/18 |
| 2018/0270854 | A1* | 9/2018 | Lee | H04W 72/042 |
| 2018/0270895 | A1* | 9/2018 | Park | H04W 76/38 |
| 2018/0278382 | A1* | 9/2018 | Ji | H04L 1/1812 |
| 2018/0279315 | A1* | 9/2018 | Salem | H04L 1/08 |
| 2018/0287744 | A1* | 10/2018 | Sundararajan | H04L 1/1819 |
| 2018/0302182 | A1* | 10/2018 | Ly | H04L 27/2613 |
| 2018/0302889 | A1* | 10/2018 | Guo | H04B 7/088 |
| 2019/0044599 | A1* | 2/2019 | Kakishima | H04B 7/063 |
| 2019/0053205 | A1* | 2/2019 | Tomeba | H04W 72/0446 |
| 2019/0074882 | A1* | 3/2019 | Zhou | H04W 72/046 |
| 2019/0081688 | A1* | 3/2019 | Deenoo | H04B 7/088 |
| 2019/0132851 | A1* | 5/2019 | Davydov | H04B 7/088 |
| 2019/0140872 | A1* | 5/2019 | Agee | H04W 52/52 |
| 2019/0149294 | A1* | 5/2019 | Pawar | H04L 27/20 370/329 |
| 2019/0158331 | A1* | 5/2019 | Pawar | H04W 72/0446 |
| 2019/0173622 | A1* | 6/2019 | Xiong | H04W 76/27 |
| 2019/0174423 | A1* | 6/2019 | Zhang | H04W 52/241 |
| 2019/0174525 | A1* | 6/2019 | Kwak | H04W 72/1268 |
| 2019/0182696 | A1* | 6/2019 | Huang | H04W 24/10 |
| 2019/0268814 | A1* | 8/2019 | Hannu | H04W 36/0069 |
| 2019/0268931 | A1* | 8/2019 | He | H04B 7/2615 |
| 2019/0305838 | A1* | 10/2019 | Davydov | H04B 17/318 |
| 2019/0312628 | A1* | 10/2019 | Bergstrom | H04B 7/0404 |
| 2019/0313388 | A1* | 10/2019 | Davydov | H04L 5/0023 |
| 2019/0319699 | A1* | 10/2019 | Lee | H04B 7/2656 |
| 2019/0326959 | A1* | 10/2019 | Davydov | H04L 5/0051 |
| 2019/0327650 | A1* | 10/2019 | Yiu | H04W 36/06 |
| 2019/0334611 | A1* | 10/2019 | Zhang | H04B 17/382 |
| 2019/0335449 | A1* | 10/2019 | Xiong | H04L 1/1671 |
| 2019/0356463 | A1* | 11/2019 | Zhang | H04W 80/08 |
| 2019/0357221 | A1* | 11/2019 | Davydov | H04L 5/0064 |
| 2019/0357303 | A1* | 11/2019 | Xiong | H04W 56/001 |
| 2019/0372830 | A1* | 12/2019 | Zhang | H04W 24/10 |
| 2019/0386764 | A1* | 12/2019 | Choi | H04L 5/0051 |
| 2019/0393968 | A1* | 12/2019 | Ioffe | H04B 17/14 |
| 2020/0021372 | A1* | 1/2020 | Zhang | H04B 7/088 |
| 2020/0044721 | A1* | 2/2020 | Choi | H04L 5/0023 |
| 2020/0052939 | A1* | 2/2020 | Xiong | H04L 5/0026 |
| 2020/0059286 | A1* | 2/2020 | Xiong | H04B 7/0857 |
| 2020/0067590 | A1* | 2/2020 | Wang | H04B 7/0695 |
| 2020/0107247 | A1* | 4/2020 | Ioffe | H04W 76/10 |
| 2020/0245355 | A1* | 7/2020 | Mueck | H04W 16/14 |
| 2020/0252116 | A1* | 8/2020 | Lee | H04B 7/0617 |
| 2020/0275524 | A1* | 8/2020 | Wang | H04W 56/001 |
| 2020/0296765 | A1* | 9/2020 | Kim | H04W 74/0833 |
| 2020/0314908 | A1* | 10/2020 | Hwang | H04B 7/02 |
| 2020/0373989 | A1* | 11/2020 | Yan | H04W 52/42 |
| 2020/0403669 | A1* | 12/2020 | Park | H04B 7/065 |
| 2021/0029731 | A1* | 1/2021 | Kundu | H04W 16/14 |

OTHER PUBLICATIONS

International Search Report dated Aug. 24, 2018 for International Application No. PCT/US2018/020909.

"PRACH design consideration." Source: Qualcomm Incorporated. Agenda item: 8.1.1.4.1. 3GPP TSG-RAN WG1 #88, Feb. 13-17, 2017, Athens, Greece. R1-1702592. 20 pages.

"Beam Recovery in NR." Source: Nokia, Alcatel-Lucent Shanghai Bell. Agenda item: 10.3.1.1.5. 3GPP TSG-RAN WG2 Meeting #97, Athens, Greece, Feb. 13-17, 2017. R2-1701681, R2-1700075. 3 pages.

"RACH preamble design for NR." Source: Huawei, HiSilicon. Agenda Item: 8.1.1.4.1. 3GPP TSG RAN WG1 Meeting #88, Athens, Greece, Feb. 13-17, 2017. R1-1701709. 16 pages.

"Beam Recovery Procedures." Source: Qualcomm Incorporated. Agenda Item: 8.1.2.2.2. 3GPP TSG-RAN WG1 #88 Feb. 13-17, 2017, Athens, Greece. R1-1702606. 8 pages.

\* cited by examiner

TECHNIQUES FOR IMPROVED BEAM MANAGEMENT

REFERENCE TO RELATED APPLICATIONS

This application is a National Phase entry application of International Patent Application No. PCT/US2018/020909 filed Mar. 5, 2018, which claims priority to of International Applications No. PCT/CN2017/075848 filed Mar. 7, 2017, entitled "INTERFERENCE RANDOMIZATION FOR BEAM RECOVERY SIGNAL SYSTEM AND TECHNIQUE" and PCT/CN2017/077716 filed Mar. 22, 2017, entitled "UPLINK (UL) BEAM MANAGEMENT FRAMEWORK WITH OVERHEAD REDUCTION", and is hereby incorporated by reference in its entirety.

FIELD

The present disclosure relates to wireless technology, and more specifically to techniques for improving beam management and/or recovery in NR (New Radio) systems, such as enabling interference randomization for beam/link recovery signal(s) and/or reducing the overhead of UL (Uplink) beam management RS (Reference Signal(s)).

BACKGROUND

In a 5G system, a BS (e.g., gNB) and UE can maintain a plurality of beams (e.g., targeting different transmission or reception directions). A good BS-UE beam pair can help to increase the link budget. However, due to UE movement, rotation and/or blockage, the quality of a current beam pair link (BPL) can become worse. In some such scenarios, the Reference Signal Receiving Power (RSRP) observed in the current BPL can be lower than a workable RSRP. In this case, the UE can trigger a beam or link recovery request.

Based on UL (Uplink) beam management, one or more good UE-BS beam pair links (BPLs) can be determined and maintained. The UL beam management can provide the BS (e.g., gNodeB) sufficient opportunities to measure the quality of different BPLs if there is no UL/DL beam correspondence. The SRS (Sounding Reference Signal) with beam sweeping is one possible way to allow the gNodeB to perform beam level measurement. However, SRS with beam sweeping is likely to be aperiodic. To enable periodic or semi-persistent (SPS) transmission, SRS overhead can be an issue.

DETAILED DESCRIPTION

Figure 1:
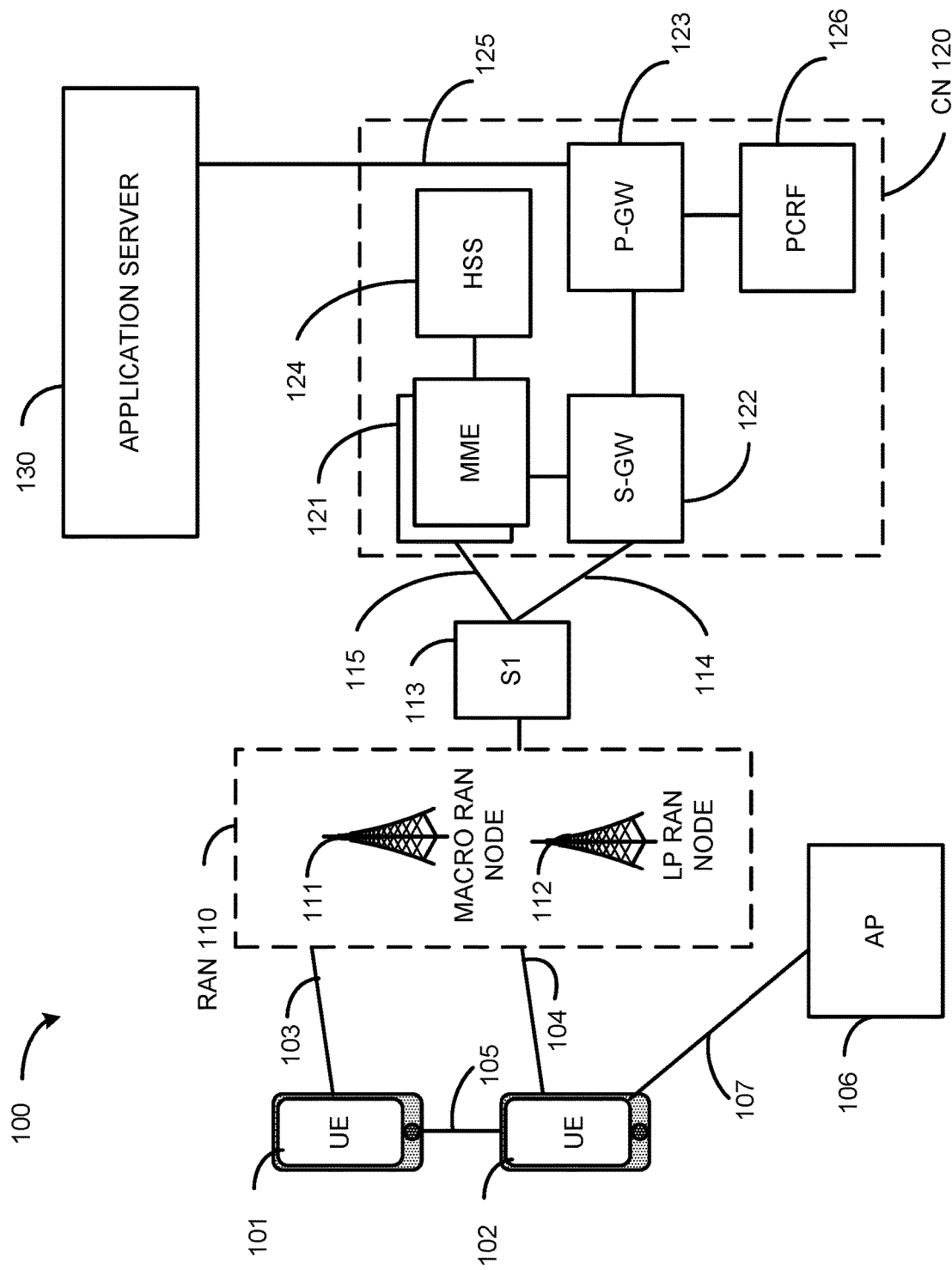
FIG. 1 is a block diagram illustrating an example user equipment (UE) useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, 8, or 16).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
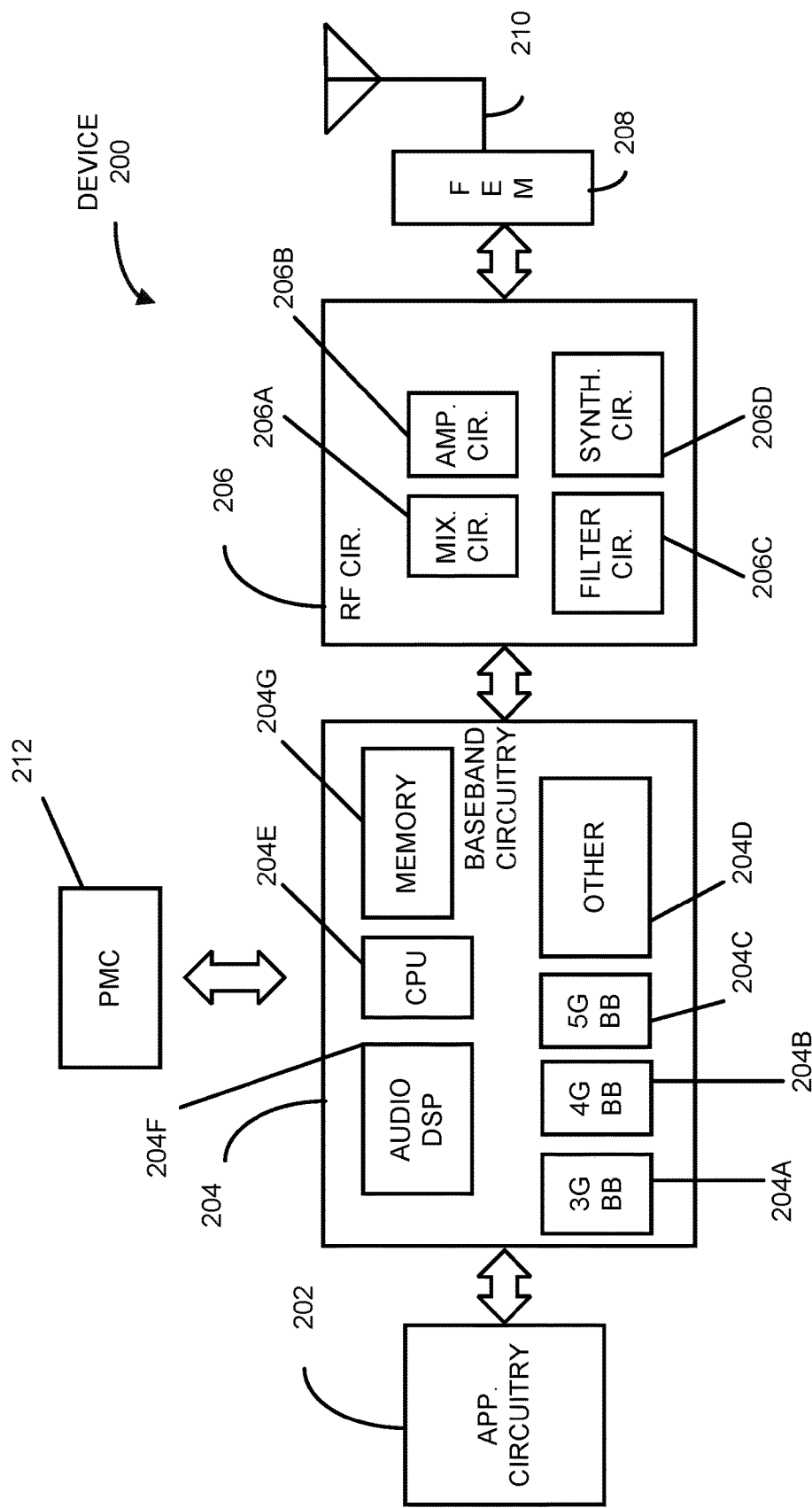
FIG. 2 is a diagram illustrating example components of a device that can be employed in accordance with various aspects discussed herein.

FIG. 2 illustrates example components of a device 200 in accordance with some embodiments. In some embodiments, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some embodiments, the device 200 may include less elements (e.g., a RAN node may not utilize application circuitry 202, and instead include a processor/controller to process IP data received from an EPC). In some embodiments, the device 200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuity 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tailbiting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206a, amplifier circuitry 206b and filter circuitry 206c. In some embodiments, the transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c.

In some embodiments, the mixer circuitry 206a of the receive signal path and the mixer circuitry 206a of the transmit signal path may include two or more mixers and may be arranged for quadrature downconversion and upconversion, respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit or receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing desirable implementation size and heat dissipation characteristics.

While FIG. 2 shows the PMC 212 coupled only with the baseband circuitry 204. However, in other embodiments, the PMC 2 12 may be additionally or alternatively coupled with, and perform similar power management operations for, other components such as, but not limited to, application circuitry 202, RF circuitry 206, or FEM 208.

In some embodiments, the PMC 212 may control, or otherwise be part of, various power saving mechanisms of the device 200. For example, if the device 200 is in an RRC_Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

If there is no data traffic activity for an extended period of time, then the device 200 may transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
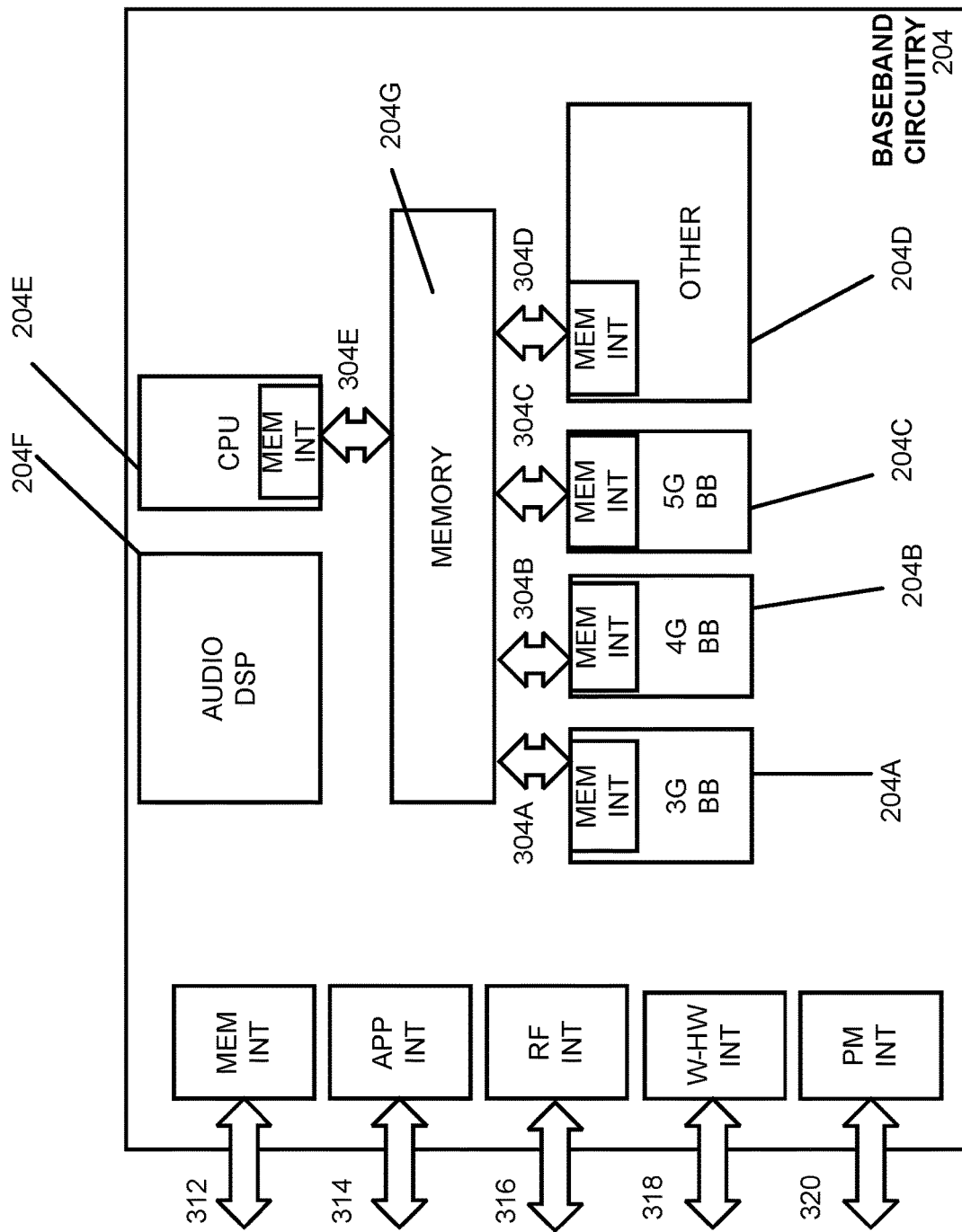
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
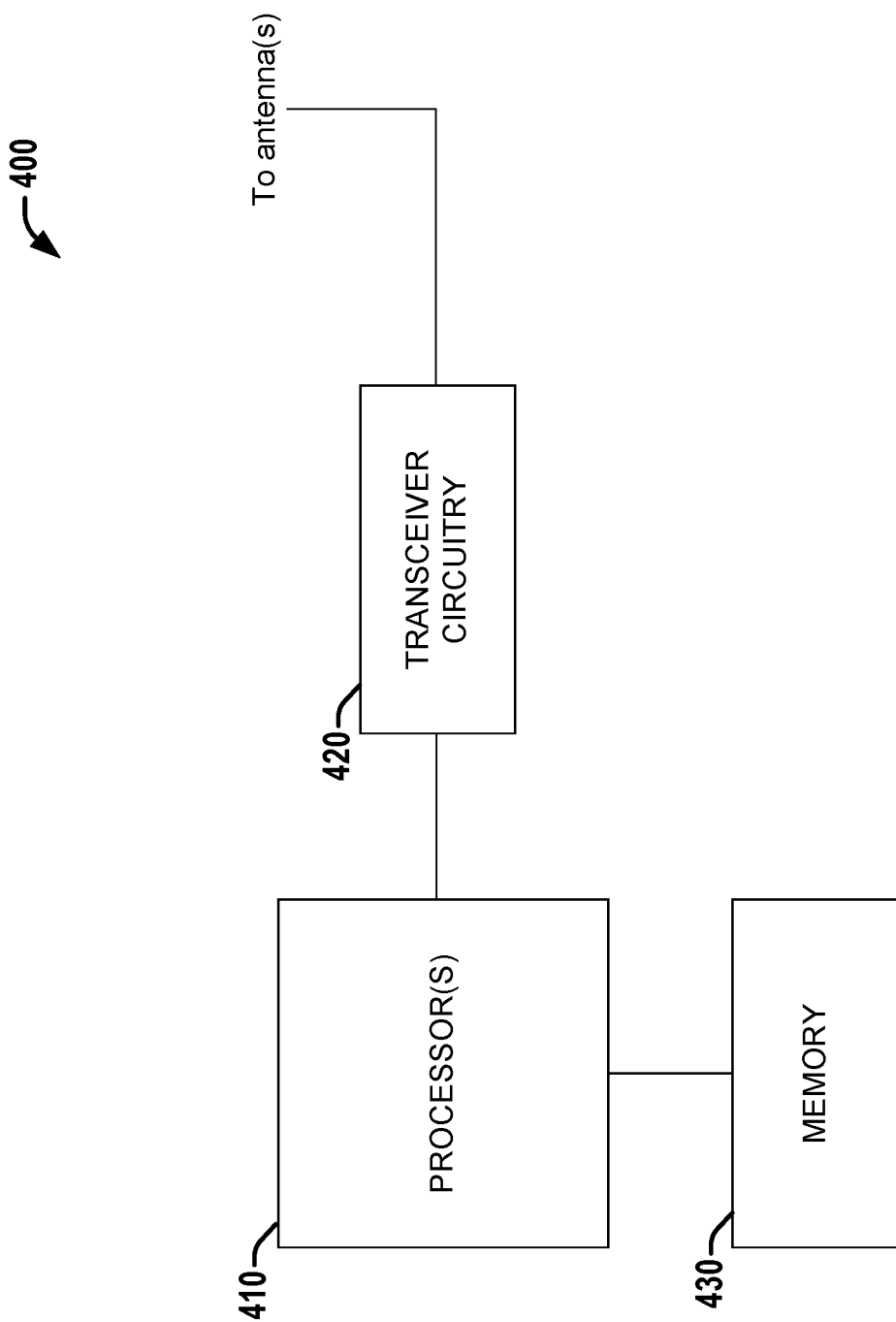
FIG. 4 is a block diagram illustrating a system employable at a UE (User Equipment) that facilitates transmission of one or more signals or channels that can enable improved beam management and/or recovery, according to various aspects described herein.

Referring to FIG. 4, illustrated is a block diagram of a system 400 employable at a UE (User Equipment) that facilitates transmission of one or more signals or channels that can enable improved beam management and/or recovery, according to various aspects described herein. System 400 can include one or more processors 410 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), transceiver circuitry 420 (e.g., comprising part or all of RF circuitry 206, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 430 (which can comprise any of a variety of storage mediums and can store instructions and/or data associated with one or more of processor(s) 410 or transceiver circuitry 420). In various aspects, system 400 can be included within a user equipment (UE). As described in greater detail below, system 400 can facilitate transmission of one or more of an interference randomized beam/link recovery signal(s) or an UL (Uplink) beam management RS (Reference Signal having reduced overhead.

In various aspects discussed herein, signals and/or messages can be generated and output for transmission, and/or transmitted messages can be received and processed. Depending on the type of signal or message generated, outputting for transmission (e.g., by processor(s) 410, processor(s) 510, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 410, processor(s) 510, etc.) can comprise one or more of: identifying physical resources associated with the signal/message, detecting the signal/message, resource element group deinterleaving, demodulation, descrambling, and/or decoding.

Figure 5:
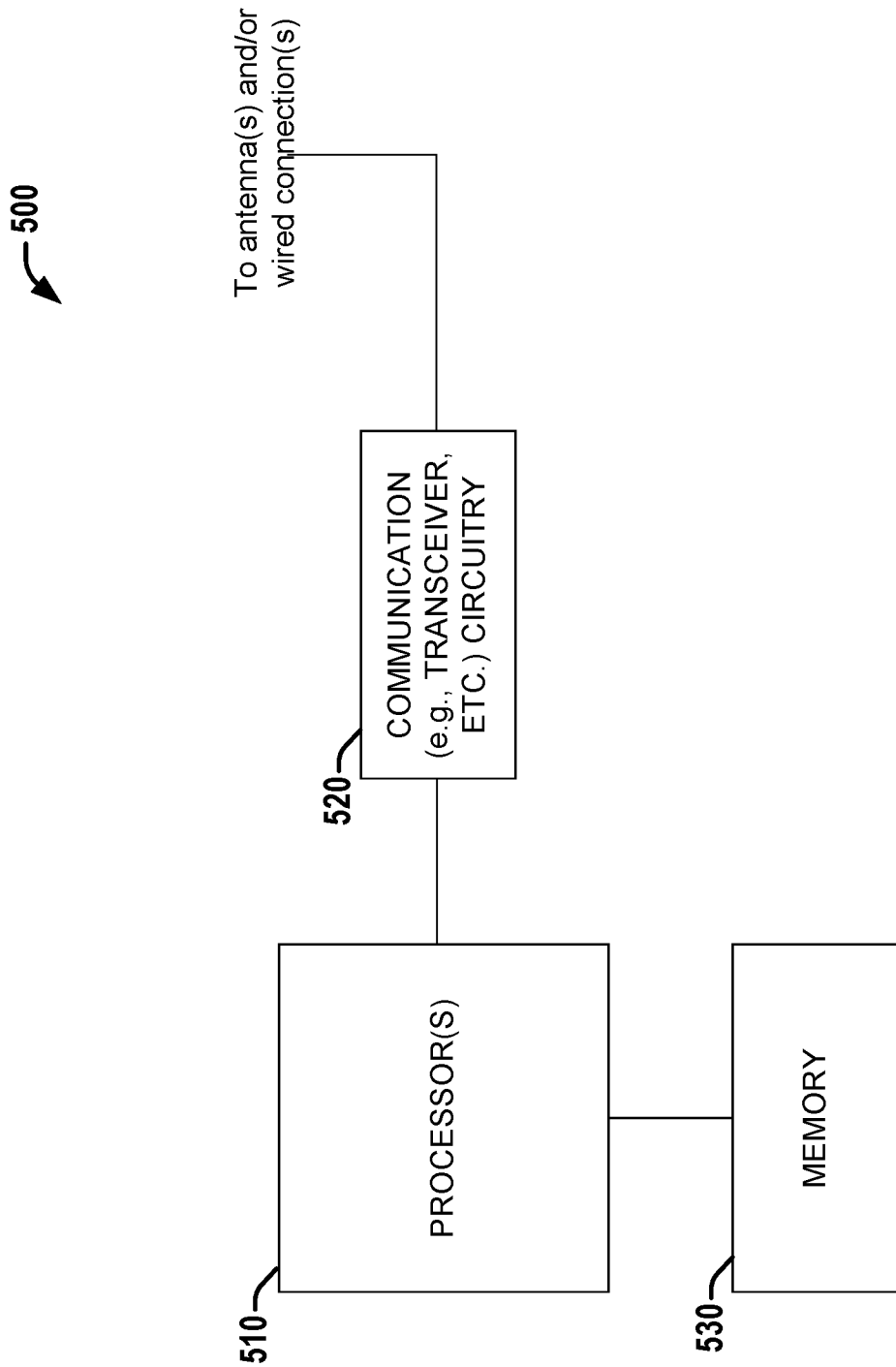
FIG. 5 is a block diagram illustrating a system employable at a BS (Base Station) that facilitates reception of one or more signals or channels that can enable improved beam management and/or recovery, according to various aspects described herein.

Referring to FIG. 5, illustrated is a block diagram of a system 500 employable at a BS (Base Station) that facilitates reception of one or more signals or channels that can enable improved beam management and/or recovery, according to various aspects described herein. System 500 can include one or more processors 510 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), communication circuitry 520 (e.g., which can comprise circuitry for one or more wired (e.g., X2, etc.) connections and/or part or all of RF circuitry 206, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 530 (which can comprise any of a variety of storage mediums and can store instructions and/or data associated with one or more of processor(s) 510 or communication circuitry 520). In various aspects, system 500 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 510, communication circuitry 520, and the memory 530 can be included in a single device, while in other aspects, they can be included in different devices, such as part of a distributed architecture. As described in greater detail below, system 500 can facilitate reception of one or more of an interference randomized beam/link recovery signal(s) or an UL (Uplink) beam management RS (Reference Signal having reduced overhead.

Interference Randomization for Beam Recovery Signal

Figure 6:
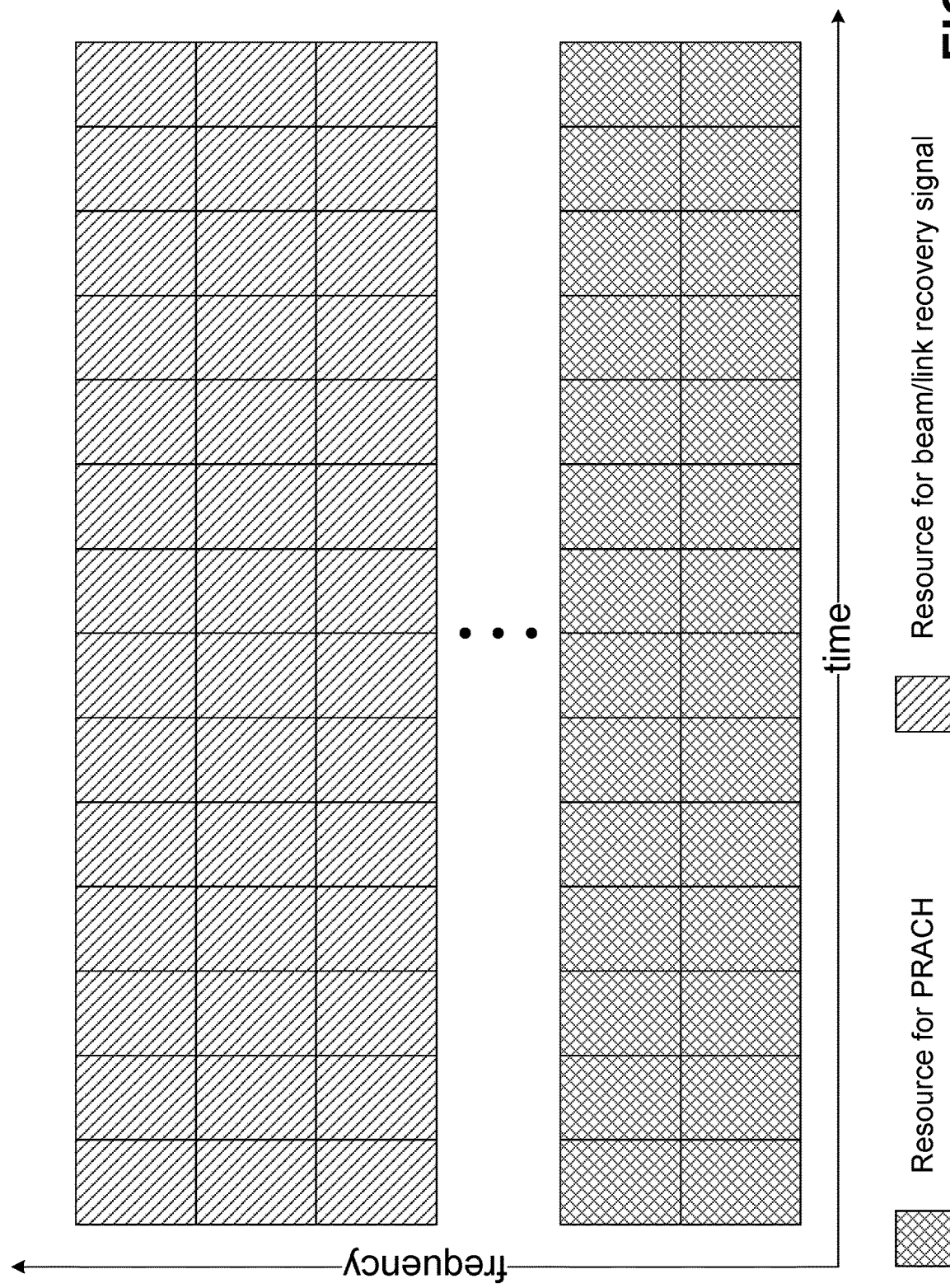
FIG. 6 is a diagram illustrating an example of one possible structure for transmission of a beam/link recovery signal transmission, according to various aspects discussed herein.

Referring to FIG. 6, illustrated is a diagram showing an example of one possible structure for transmission of a beam/link recovery signal transmission, according to various aspects discussed herein. In various aspects, the BS (e.g., gNB) can use different receiving beams (e.g., via communication circuitry 520 as selected by processor(s) 510) to receive the beam/link recovery signal (e.g., generated by processor(s) 410, transmitted via transceiver circuitry 420, received via communication circuitry 520, and processed by processor(s) 510) at different symbols. In scenarios wherein there is no beam correspondence or only partial beam correspondence at the BS (e.g., gNB) side, the UE can transmit (e.g., via transceiver circuitry 420) its beam/link recovery signal (e.g., generated by processor(s) 410) repeatedly in multiple symbols, which can introduce certain interference to neighboring cell(s). Thus, in a first set of aspects discussed herein (e.g., aspects associated with interference randomization for a beam and/or link recovery signal), an interference randomization mechanism can be employed to enhance the system performance. In various embodiments employing the first set of aspects, different UEs can be distinguished by different cyclic shifts and/or time/frequency resource.

Various embodiments discussed herein can employ techniques associated with the first set of aspects to facilitate interference randomization for a beam/link recovery signal. Interference randomization techniques, as discussed herein, comprise techniques that can minimize interference between beam/link recovery signals of multiple UEs, for example, by having those UEs generate and/or resource map the beam/link recovery signal based on techniques that can statistically reduce interference between UEs, such as via employing (e.g., indicated, configured, predetermined, etc.) hopping between sequences, codes, and/or time/frequency resources, such that interference between UEs is reduced. In various embodiments employing the first set of aspects, one or more of the following techniques can be employed (e.g., by system 400 and/or system 500) to enable interference randomization for a beam/link recovery signal: (a) sequence hopping; (b) cyclic shift hopping; and/or (c) time and/or frequency resource hopping.

In various embodiments employing the first set of aspects, the beam/link recovery signal for different UEs can be distinguished by different cyclic shifts (e.g., as applied by processor(s) 410 and transceiver circuitry 420) and/or different time/frequency resources (e.g., as mapped by processor(s) 410 and transmitted by transceiver circuitry 420). In scenarios wherein the beam correspondence assumption at the gNodeB side cannot be guaranteed, the UE can transmit (e.g., via transceiver circuitry 420) multiple beam/link recovery signals (e.g., generated by processor(s) 410). However, if the UE simply repeats the beam/link recovery signal (e.g., via processor(s) 410 and transceiver circuitry 420), this would introduce inter-cell interference, which can degrade the system performance. Therefore, in various embodiments, mechanisms of the first set of aspects discussed herein can be employed to enable interference randomization.

In various embodiments employing the first set of aspects, different sequences employed (e.g., by processor(s) 410 and transceiver circuitry 420) in distinct beam/link recovery resources. For example, the base sequence of beam/link recovery signal can be determined (e.g., by processor(s) 410 and/or processor(s) 510) based on one or more of the cell ID, virtual cell ID, symbol/slot/frame index and/or frequency resource index (e.g., starting RB index or resource ID). In one example, K frequency resources can be configured (e.g., via higher layer signaling generated by processor(s) 510, transmitted by communication circuitry 520, received by transceiver circuitry 420, and processed by processor(s) 410) by a BS (e.g., gNB), and the base sequence used (e.g., by processor(s) 410) for the transmission (e.g., by transceiver circuitry 420) of a beam/link recovery signal can be different in different resources.

In various embodiments employing the first set of aspects, cyclic shift hopping can be employed (e.g., via processor(s) 410 and transceiver circuitry 420) by a UE. In one example, the UE can be configured (e.g., via higher layer signaling generated by processor(s) 510, transmitted by communication circuitry 520, received by transceiver circuitry 420, and processed by processor(s) 410) with one starting cyclic shift $\alpha_0$, and its cyclic shift $\alpha$ in different time/frequency resource(s) for the subsequent transmission(s) (e.g., via transceiver circuitry 420) of beam/link recovery signal (e.g., generated by processor(s) 410) can be the same or different. In scenarios wherein different cyclic shift values are used (e.g., by processor(s) 410 and transceiver circuitry 420) for the transmission (e.g., via transceiver circuitry 420) of beam/link recovery signal (e.g., generated by processor(s) 410), cyclic shift values can be defined as a function of at least a symbol index and/or a frequency resource index. In various embodiments, cyclic shifts can be defined as shown in one of equations (1)-(3):

$$\alpha_{i,l} = f(i,l) \tag{1}$$

or $$\alpha_{i,l} = f(i) \tag{2}$$

or $$\alpha_i = f(l) \quad (3),$$

As one specific example, cyclic shift can be defined as in equation (4):

$$\alpha_{i,l} = (\alpha_0 + c_0 \cdot i + c_1 \cdot l) \bmod(N_0) \quad (4),$$

where $c_0$, $c_1$ can be constants, which can be predefined or configured by higher layers via NR Minimum System Information (NR MSI), NR Remaining Minimum System Information (NR RMSI), NR Other System Information (NR OSI) or radio resource control (RRC) signaling (e.g., generated by processor(s) 510, transmitted via communication circuitry 520, received via transceiver circuitry 420, and processed by processor(s) 410). $N_0$ can be a constant (e.g., $N_0$=12); i can be the symbol index for the transmission (e.g., via transceiver circuitry 420) of beam/link recovery signal (e.g., by processor(s) 410); and l can be the frequency resource index.

In various embodiments employing the first set of aspects, as a further extension, a cyclic shift hopping pattern can be employed (e.g., by processor(s) 410 and transceiver circuitry 420), which can be defined as a function of one or more of the following parameters: a physical cell ID, a virtual cell ID, a symbol/slot/frame index, a frequency resource index, and/or a UE ID (e.g., a C-RNTI (Cell Radio Network Temporary Identifier)). In one example, the cyclic shift can be defined as in equation (5):

$$\alpha_i = f(\alpha_0, n_s, N_{ID}^{cell}) \quad (5),$$

where $N_{ID}^{cell}$ can be the physical cell ID and $n_s$ can be the slot index.

In various embodiments employing the first set of aspects, the UE can apply (e.g., via processor(s) 410 and transceiver circuitry 420) frequency hopping for the transmission (e.g., via transceiver circuitry 420) of the beam/link recovery signal (e.g., generated by processor(s) 410) in multiple symbols. As one example, a UE can determine (e.g., via processor(s) 410) the starting symbol for the transmission (e.g., via transceiver circuitry 420) of the beam/link recovery signal (e.g., generated by processor(s) 410) in accordance with downlink beam quality measurement (e.g., measured by processor(s) 410 based on signals and/or noise and/or interference received via transceiver circuitry 420), and can perform frequency hopping (e.g., via processor(s) 410 and transceiver circuitry 420) on subsequent transmissions, according to the frequency hopping pattern employed by the UE (e.g., via processor(s) 410 and transceiver circuitry 420).

In various embodiments employing the first set of aspects, within the hopped frequency resources, the sequence or cyclic shifts used (e.g., by processor(s) 410 and transceiver circuitry 420) for the transmission (e.g., via transceiver circuitry 420) of the beam/link recovery signal (e.g., generated by processor(s) 410) employed in the hopped frequency resources can be the same or different.

Figure 7:
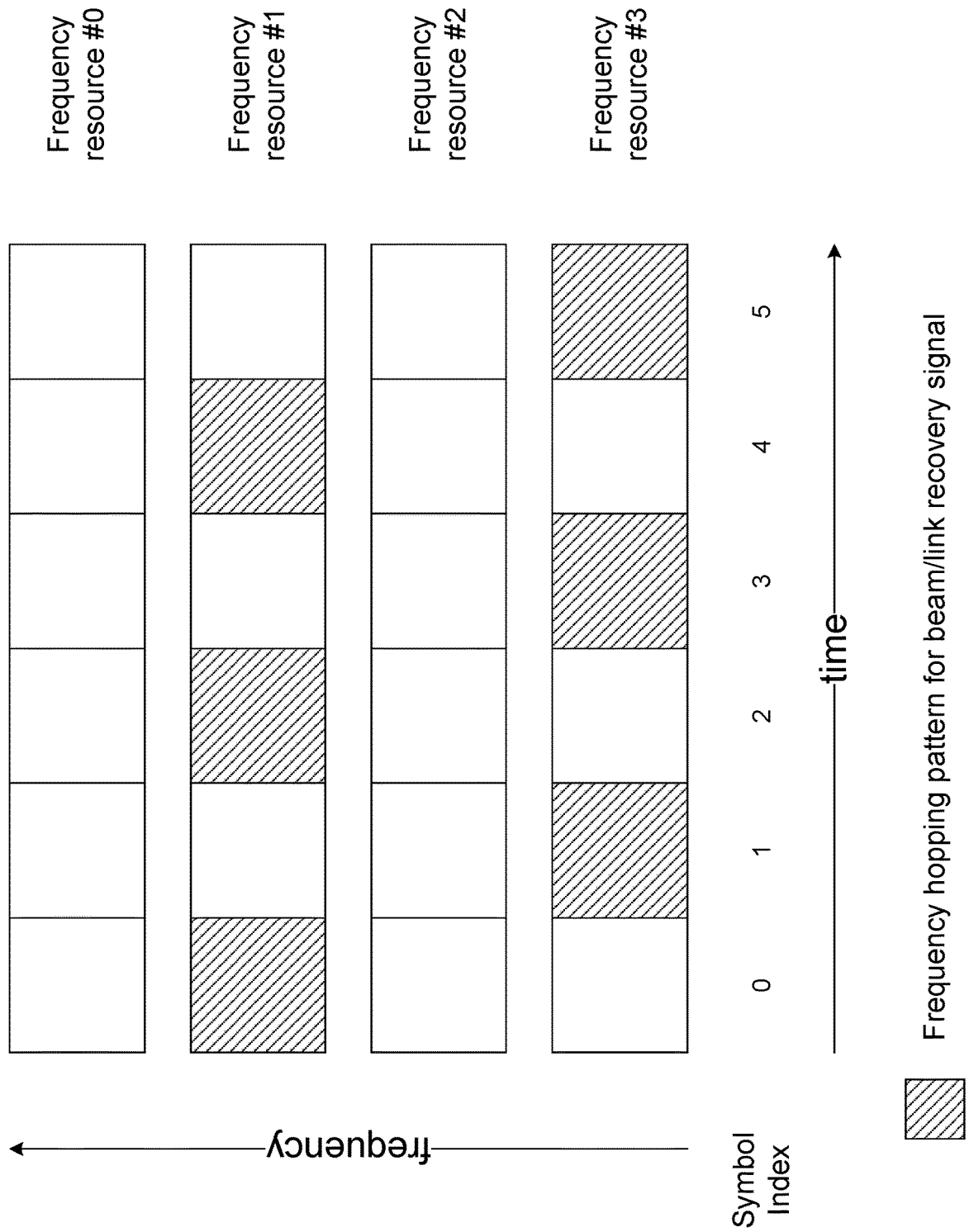
FIG. 7 is a diagram illustrating one example of a first option for a frequency hopping pattern that can be employed for the transmission of a beam/link recovery signal, according to various aspects discussed herein.

According to a first option for the first set of aspects, the beam/link recovery signal (e.g., generated by processor(s) 410) can be transmitted (e.g., by transceiver circuitry 420) L times, and a constant frequency resource offset can be applied (e.g., by processor(s) 410 and transceiver circuitry 420) between two transmissions (e.g., via transceiver circuitry 420) of the beam/link recovery signal (e.g., generated by processor(s) 410). In one example, the constant frequency resource offset can be [M/2], where M is the total number of frequency resources for the transmission of beam/link recovery signal, which can be configured by higher layer signaling (e.g., generated by processor(s) 510, transmitted via communication circuitry 520, received via transceiver circuitry 420, and processed by processor(s) 410). Referring to FIG. 7, illustrated is a diagram showing one example of a first option for a frequency hopping pattern that can be employed for the transmission of a beam/link recovery signal, according to various aspects discussed herein. In the example of FIG. 7, the UE can determine (e.g., via processor(s) 410) the starting symbol for the transmission (e.g., via transceiver circuitry 420) of the beam/link recovery signal (e.g., generated by processor(s) 410) in accordance with downlink beam quality measurement(s) (e.g., performed by processor(s) 410 and transceiver circuitry 420), and can perform frequency hopping (e.g., via processor(s) 410 and transceiver circuitry 420) on the subsequent transmissions (e.g., via transceiver circuitry 420) according to the frequency hopping pattern.

Figure 8:
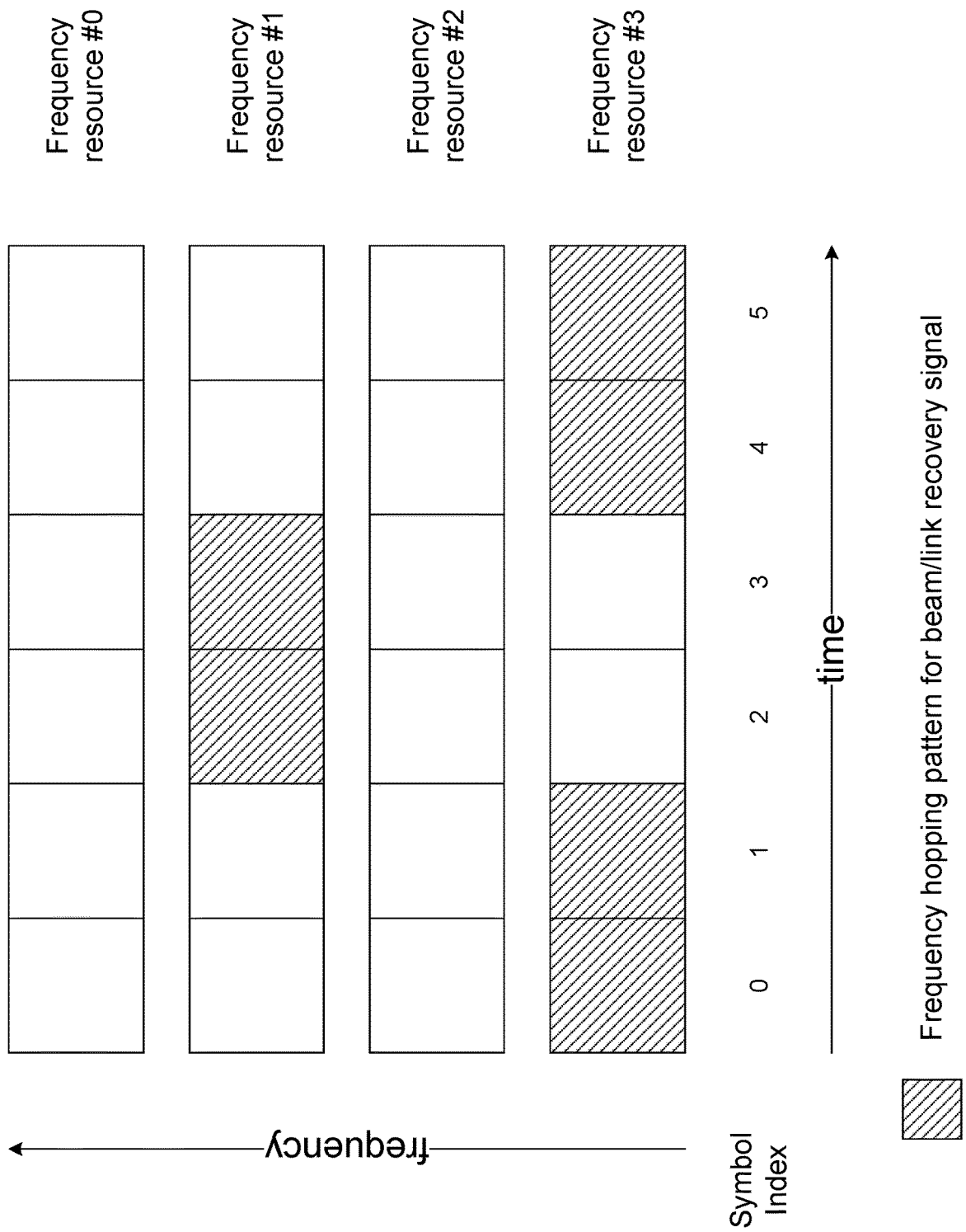
FIG. 8 is a diagram illustrating one example of a second option for a frequency hopping pattern that can be employed for the transmission of a beam/link recovery signal, according to various aspects discussed herein.

According to a second option for the first set of aspects, the UE can perform frequency hopping (e.g., via processor(s) 410 and transceiver circuitry 420) between two frequency resources for transmission (e.g., via transceiver circuitry 420) of the beam/link recovery signal (e.g., generated by processor(s) 410). More specifically, the UE can transmit (e.g., via transceiver circuitry 420) the first [L/2] beam/link recovery signal(s) (e.g., generated by processor(s) 410) using a first frequency resource and the second [L/2] beam/link recovery signal(s) (e.g., generated by processor(s) 410) using second frequency resource. The frequency distance between the first and second frequency resources can be predefined or can be configured by higher layer signaling. In one example, the frequency distance can be [M/2]. Referring to FIG. 8, illustrated is a diagram showing one example of a second option for a frequency hopping pattern that can be employed for the transmission of a beam/link recovery signal, according to various aspects discussed herein.

According to a third option for the first set of aspects, the UE can perform frequency hopping (e.g., via processor(s) 410 and transceiver circuitry 420) on multiple transmissions (e.g., via transceiver circuitry 420) of a beam/link recovery signal (e.g., generated by processor(s) 410) according to a frequency hopping pattern. As one example, the frequency hopping pattern employed by the UE (e.g., by processor(s) 410) can be defined as a function of one or more of the following parameters: a physical cell ID, a virtual cell ID, the frequency resource for transmission of the beam/link recovery signal in the first symbol, a symbol/slot/frame index, and/or a UE ID (e.g., C-RNTI (Cell Radio Network Temporary Identifier)). In one example, the frequency resource index for transmission (e.g., via transceiver circuitry 420) of each beam/link recovery signal (e.g., generated by processor(s) 410) can be given by equation (6):

$$I_{freq} = f(N_{ID}^{cell}, n_{symbol}) \bmod(M) \quad (6),$$

where $N_{ID}^{cell}$ can be the physical cell ID, $n_{symbol}$ can be the symbol index, and $I_{freq}$ can be the frequency resource index for transmission (e.g., via transceiver circuitry 420) of the beam/link recovery signal (e.g., generated by processor(s) 410).

Figure 9:
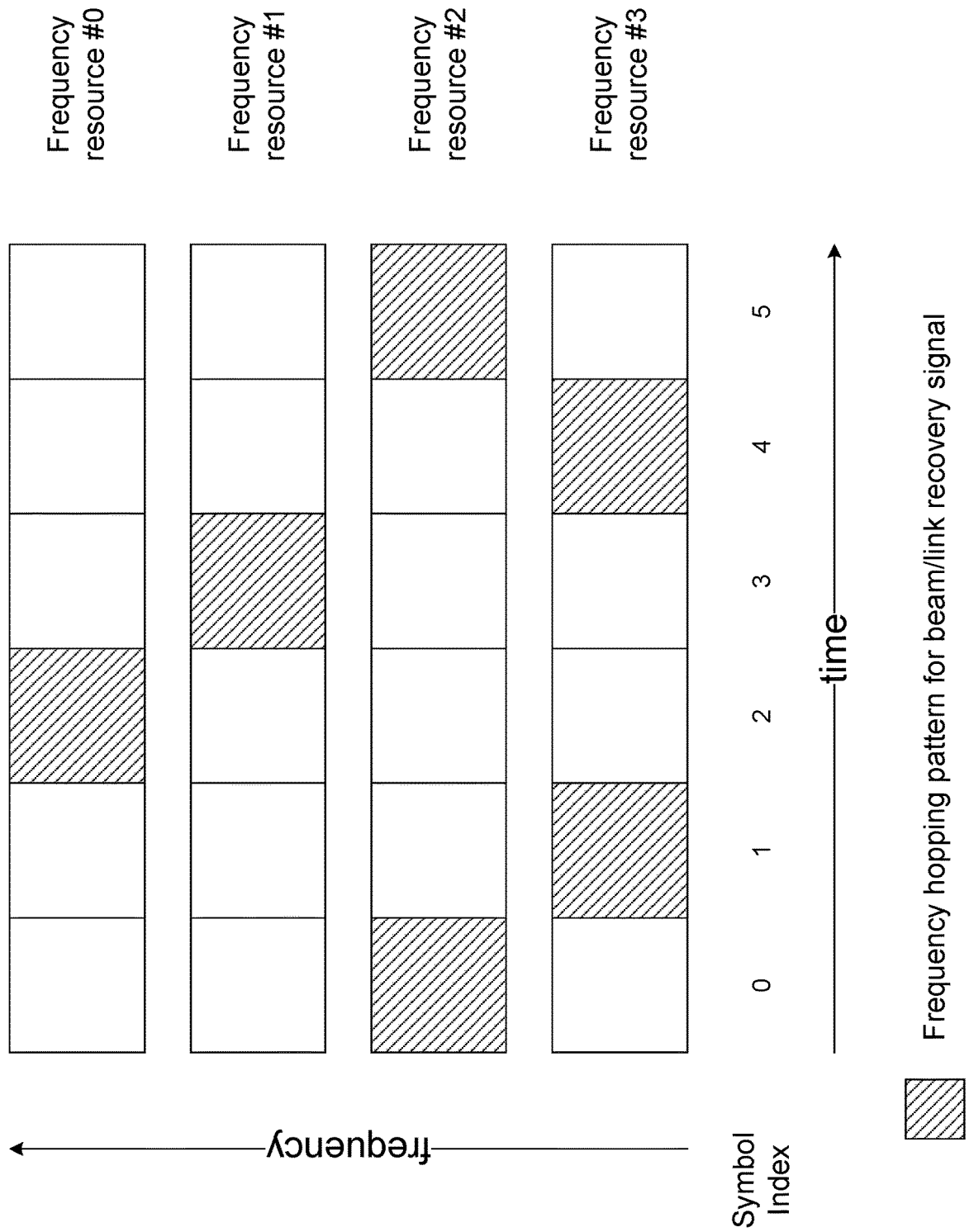
FIG. 9 is a diagram illustrating one example of a third option for a frequency hopping pattern that can be employed for the transmission of a beam/link recovery signal, according to various aspects discussed herein.

Referring to FIG. 9, illustrated is a diagram showing one example of a third option for a frequency hopping pattern that can be employed for the transmission of a beam/link recovery signal, according to various aspects discussed herein. According to the third example, the UE can determine (e.g., via processor(s) 410) the starting symbol for the transmission of beam/link recovery signal in accordance with downlink beam quality measurement(s) (e.g., as determined by processor(s) 410 based on signal(s)/noise/interference received via transceiver circuitry 420), and can perform frequency hopping (e.g., via processor(s) 410 and transceiver circuitry 420) on the subsequent transmissions according to the frequency hopping pattern. As one example, in scenarios wherein the UE starts the transmission on symbol #1, the UE can transmit (e.g., via transceiver circuitry 420) the beam/link recovery signal (e.g., generated by processor(s) 410) on frequency resource #3, #0, and #1 when L=3.

In various embodiments employing the first set of aspects, in scenarios wherein the BS (e.g., gNB) beams can be divided into several groups, where one group can comprise beams that are highly uncorrelated, then the UE can transmit (e.g., via transceiver circuitry 420) the beam/link recovery signal (e.g., generated by processor(s) 410) to the time/frequency resources in one beam group. In such aspects, the time/frequency resources in one beam group can be determined by one or more of a cell ID, a virtual cell ID, and/or slot/subframe/frame index. In various aspects, the number of beams in one beam group and/or the number of beam groups can be pre-defined or can be configured by higher layer signaling (e.g., generated by processor(s) 510, transmitted via communication circuitry 520, received via transceiver circuitry 420, and processed by processor(s) 410). Alternatively, the beam pattern for each time/frequency resource can be determined by the beam pattern in PSS (Primary Synchronization Signal)/SSS (Secondary Synchronization Signal) and/or beam management CSI-RS (Channel State Information Reference Signal).

Figure 10:
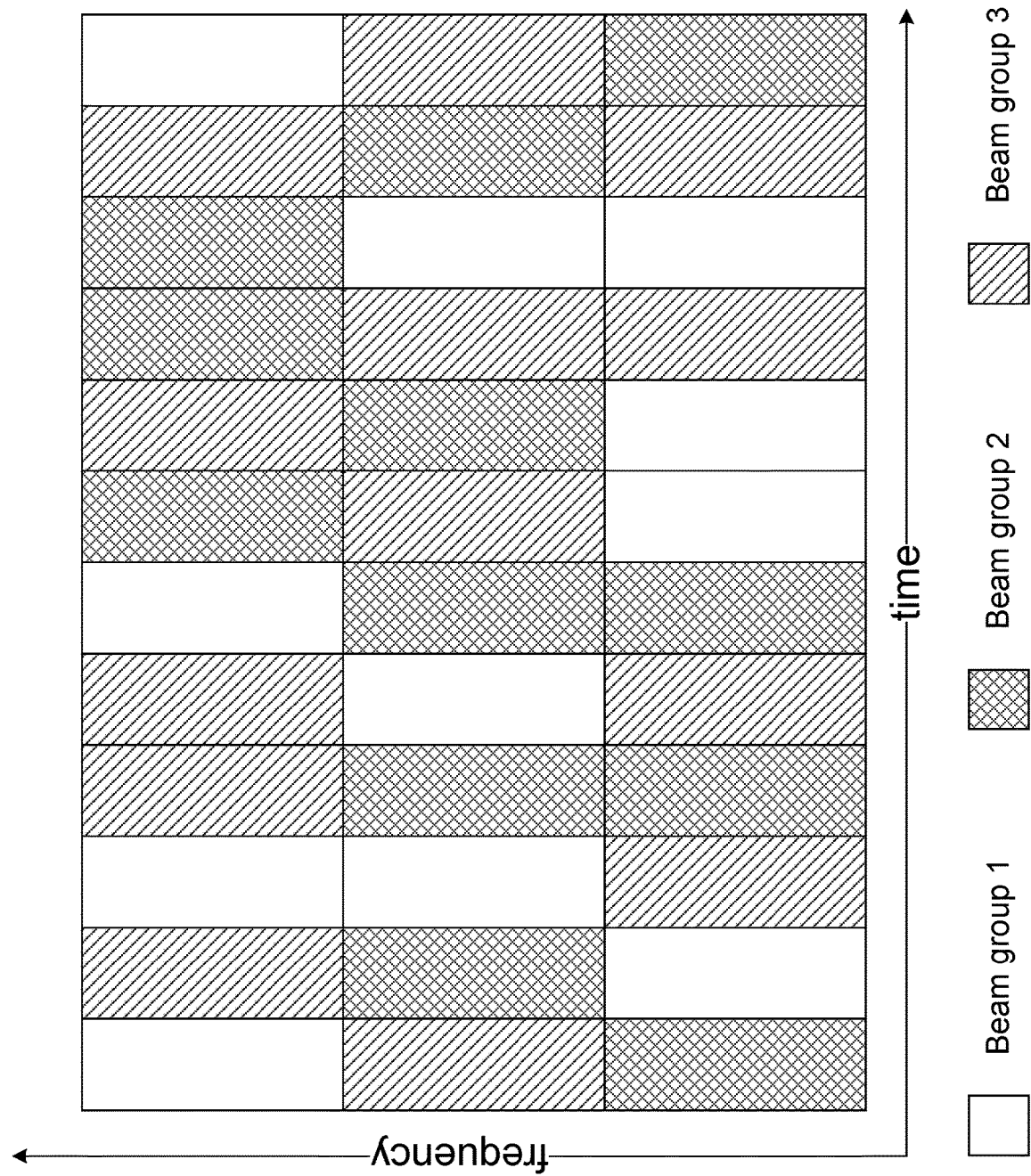
FIG. 10 is a diagram illustrating one example for the time/frequency resources for each beam group in a scenario with three beam groups in one slot, according to various aspects discussed herein.

In one example, the BS (e.g., gNB) can define an initial time/frequency index set for one beam group (e.g., which can be configured via higher layer signaling generated by processor(s) 410, transmitted via transceiver circuitry 420, received via communication circuitry 520, and processed by processor(s) 510). In such aspects, the time/frequency index for each slot can be calculated (e.g., by processor(s) 410 and processor(s) 510) based on the configured initial time/frequency index as well as a time/frequency offset which can be determined based on one or more of the cell ID and/or slot/subframe/frame index. Referring to FIG. 10, illustrated is a diagram showing one example for the time/frequency resources for each beam group in a scenario with three beam groups in one slot, according to various aspects discussed herein.

In various embodiments employing the first set of aspects, a relatively large subcarrier spacing (e.g., larger than a reference subcarrier spacing employed for PRACH) can be applied (e.g., which can be configured via higher layer signaling generated by processor(s) 410, transmitted via transceiver circuitry 420, received via communication circuitry 520, and processed by processor(s) 510), for the transmission (e.g., via transceiver circuitry 420) of the beam/link recovery signal (e.g., generated by processor(s) 410), which can help to reduce overhead. In various aspects, the scale of the subcarrier spacing for the beam/link recovery signal (e.g., generated by processor(s) 410) can be pre-defined or can be configured via higher layer signaling (e.g., generated by processor(s) 510, transmitted via communication circuitry 520, received via transceiver circuitry 420, and processed by processor(s) 410).

Further, the beam/link recovery signal (e.g., generated by processor(s) 410) can be transmitted (e.g., via transceiver circuitry 420) in a slot which is configured by higher layer signaling (e.g., generated by processor(s) 510, transmitted via communication circuitry 520, received via transceiver circuitry 420, and processed by processor(s) 410) or can be predefined in the specification. In various aspects, the beam/link recovery signal (e.g., generated by processor(s) 410) can be transmitted (e.g., via transceiver circuitry 420) in the same slot but in different symbols than PRACH transmission. In such scenarios, the beam/link recovery signal (e.g., generated by processor(s) 410) can be multiplexed in a TDM (Time Division Multiplexing) manner with transmission (e.g., via transceiver circuitry 420) of PRACH (e.g., generated by processor(s) 410). In various such aspects, the subcarrier spacing for PRACH can be considered to be the reference subcarrier spacing, and a larger subcarrier spacing can be applied (e.g., by processor(s) 410 and processor(s) 510) for the transmission (e.g., via transceiver circuitry 420) of beam/link recovery signal (e.g., generated by processor(s) 410).

In various embodiments employing the first set of aspects, the slot/symbol index for the beam/link recovery signal can be pre-defined, can be configured by higher layer signaling (e.g., generated by processor(s) 510, transmitted via communication circuitry 520, received via transceiver circuitry 420, and processed by processor(s) 410), and/or determined by the cell ID or virtual cell ID.

UL (Uplink) Beam Management Framework with Overhead Reduction

In various embodiments employing a second set of aspects (e.g., aspects associated with an UL beam management framework that facilitates overhead reduction), one or more of the following techniques can be employed (e.g., by system 400 and/or system 500) to reduce the overhead of UL (Uplink) beam management RS (Reference Signal(s)): (a) Network triggered PRACH (Physical Random Access Channel) or SR (Scheduling Request) channel (e.g., wherein SR channel as used herein can refer to PRACH or any other channel or signal used for beam recovery) and/or (b) enhancement(s) to the SR channel.

UL Beam Management Framework

For UL beam management, one or more of the following channels or signals can be employed in various aspects: (a) PRACH with beam sweeping; (b) PRACH and/or SR channel used for SR and/or beam recovery; and/or (c) SRS with beam sweeping. As used herein, SR channel can comprise PRACH and/or other channel(s)/signal/(s) used for beam recovery. Additionally or alternatively, SR channel can be used to refer to an associated PUCCH format.

Figure 11:
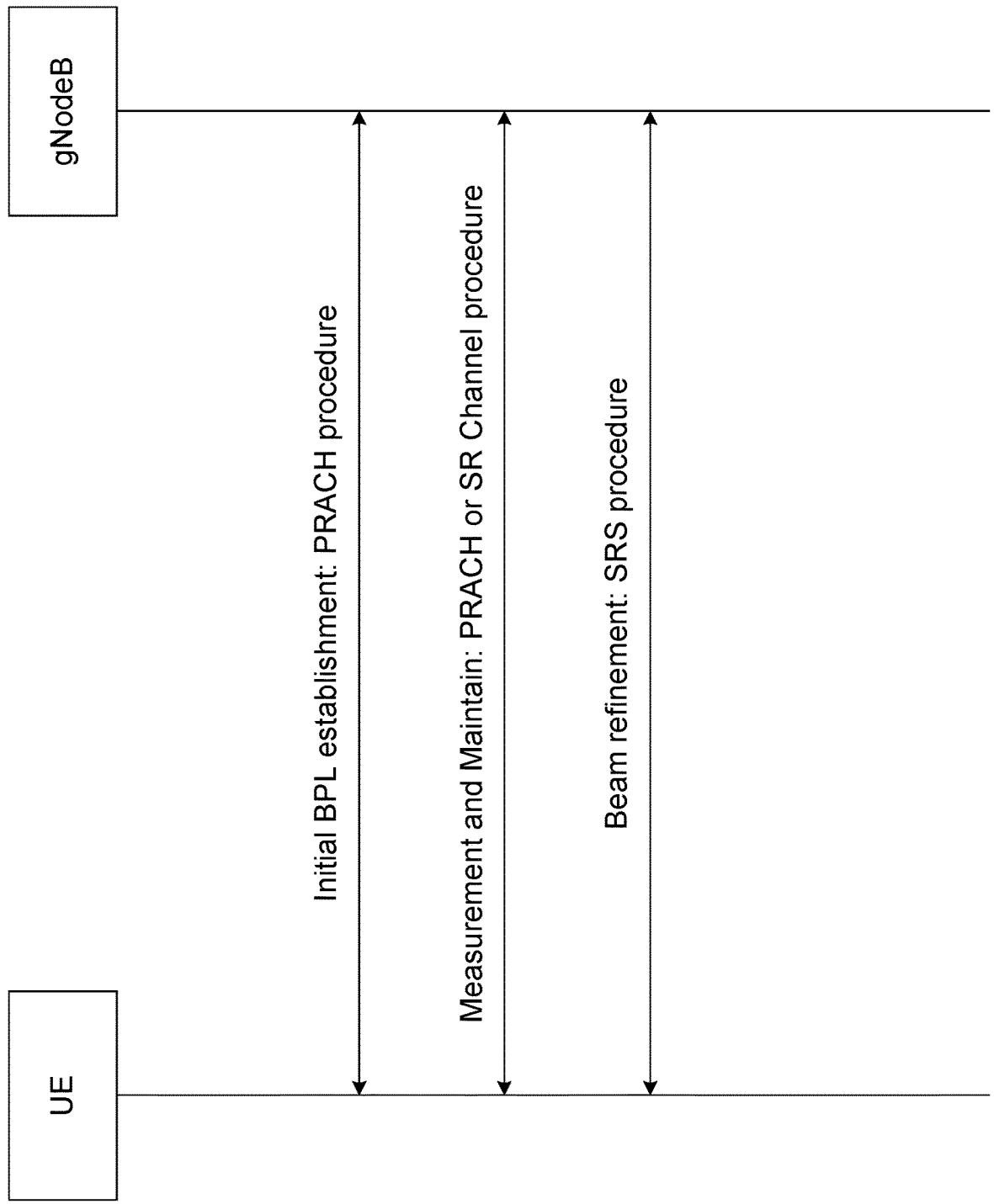
FIG. 11 is a diagram illustrating an UL beam management procedure that can be employed in connection with various aspects discussed herein.

In various embodiments employing the second set of aspects, PRACH (e.g., generated by processor(s) 410, transmitted via transceiver circuitry 420, received via communication circuitry 520, and processed by processor(s) 510) with beam sweeping (e.g., via communication circuitry 520 sweeping in a time-varying manner through multiple beams based on associated beamforming weights selected by processor(s) 510) can be used for initial BPL (Beam Pair Link) acquisition. The transmission (e.g., via transceiver circuitry 420) of PRACH or SR channel (e.g., generated by processor(s) 410) can be triggered by the BS (e.g., gNodeB) to measure (e.g., via processor(s) 510) the beam quality of different BPLs (e.g., based on signal(s)/noise/interference received via communication circuitry 520), which can be transmitted (e.g., via communication circuitry 520) in periodic, SPS (Semi-Persistent Scheduling), and/or aperiodic manner. In various aspects, SRS (Sounding Reference Signal) with beam sweeping can be used for gNodeB and UE beam refinement. Referring to FIG. 11, illustrated is a diagram showing an UL beam management procedure that can be employed in connection with various aspects discussed herein.

In various embodiments employing the second set of aspects, the SR channel can be transmitted (e.g., via transceiver circuitry 420) periodically and the period can be pre-defined or configured by higher layer signaling or DCI (e.g., generated by processor(s) 510, transmitted by communication circuitry 520, received by transceiver circuitry 420, and processed by processor(s) 410). The dedicated resource of one SR channel can be allocated to a UE, which can include the cyclic shift, frequency resource, and the beam group or subset index (e.g., via signaling generated by processor(s) 510, transmitted by communication circuitry 520, received by transceiver circuitry 420, and processed by processor(s) 410). The BS (e.g., gNodeB) can then receive the SR channel (e.g., generated by processor(s) 410, transmitted by transceiver circuitry 420, received by communication circuitry 520, and processed by processor(s) 510) with full beams or a subset/group of beams.

In various embodiments employing the second set of aspects, the SR channel can be triggered in a SPS or aperiodic manner. The SPS based SR channel transmission can be enabled by higher layer signaling or DCI (e.g., generated by processor(s) 510, transmitted by communication circuitry 520, received by transceiver circuitry 420, and processed by processor(s) 410). In various such aspects, the DCI (e.g., generated by processor(s) 510, transmitted by communication circuitry 520, received by transceiver circuitry 420, and processed by processor(s) 410) used to trigger the SPS can configure the resource(s) of the SR channel for the UE to use. In various embodiments, the DCI can comprise one or more of the following indicators: (a) Period and offset, including slot or symbol offset; (b) Cyclic shift; (c) Comb offset index; (d) Frequency resource index (e.g., starting RB (Resource Block)/RBG (Resource Block Group) index; and/or (e) BS (e.g., gNB) beam group/subset index.

In various embodiments employing the second set of aspects, the BS (e.g., gNodeB) can send (e.g., via communication circuitry 520) some feedback (e.g., generated by processor(s) 510) after receiving (e.g., via communication circuitry 520) the SR channel (e.g., generated by processor(s) 410, transmitted via transceiver circuitry 420, received via communication circuitry 520, and processed by processor(s) 510), wherein the feedback can comprise the TA (Timing Advance) of some or each of the BPLs. Alternatively, the BS (e.g., gNodeB) can also send (e.g., via communication circuitry 520) some response on update for one or more BPLs (e.g., generated by processor(s) 510) if better BPL(s) have been discovered (e.g., by processor(s) 510), which can be indicated by MAC (Medium Access Control) CE (Control Element) or DCI (Downlink Control Information) (e.g., generated by processor(s) 510, transmitted via communication circuitry 520, received via transceiver circuitry 420, and processed by processor(s) 410).

In various embodiments employing the second set of aspects, for a UE, the resource used for transmission (e.g., via transceiver circuitry 420) of Network (NW)-triggered SR channel (e.g., generated by processor(s) 410) and UE-initialized SR channel (e.g., generated by processor(s) 410) can be orthogonal and can be multiplexed in the same or different slot(s) in one or more of a FDM (Frequency Division Multiplexing), a TDM (Time Division Multiplexing), or a CDM (Code Division Multiplexing) manner. Alternatively, in various aspects, the resource can be shared for the UE, and the BS (e.g., gNodeB) can indicate the gNB beam group/subset index (e.g., via signaling generated by processor(s) 510, transmitted via communication circuitry 520, received via transceiver circuitry 420, and processed by processor(s) 410). In scenarios wherein collision between the UE-initialized and NW-triggered schemes occurs, the UE-initialized transmission (e.g., generated by processor(s) 410, transmitted via transceiver circuitry 420, received via communication circuitry 520, and processed by processor(s) 510) can be held off until the next opportunity for transmission (e.g., generated by processor(s) 410) of the SR channel (e.g., generated by processor(s) 410).

In various embodiments employing the second set of aspects, the NW-triggered SR channel (e.g., generated by processor(s) 410, transmitted via transceiver circuitry 420, received via communication circuitry 520, and processed by processor(s) 510) can also be used for the measurement (e.g., by processor(s) 510) of multiple BPLs. In one option, the BS (e.g., gNodeB) can use one SRS resource index (SRI) or BPL index to indicate (e.g., via signaling generated by processor(s) 510, transmitted via communication circuitry 520, received via transceiver circuitry 420, and processed by processor(s) 410) a Tx (Transmit) beam and the UE can transmit (e.g., via transceiver circuitry 420) the indicated signal (e.g., generated by processor(s) 410) via one or multiple SR resources. To measure the quality of multiple BPLs, the BS (e.g., gNodeB) can schedule multiple instances of the SR channel via multiple DCIs (e.g., generated by processor(s) 510, transmitted via communication circuitry 520, received via transceiver circuitry 420, and processed by processor(s) 410). In another option, the BS (e.g., gNodeB) can indicate a group of SRIs or BPLs (e.g., comprising one or more) and the UE can use the corresponding Tx beams in each SRI or BPL to transmit (e.g., via transceiver circuitry 420) one or multiple SR resources (e.g., generated by processor(s) 410). Alternatively, there can be multiple SRI group indexes and the pattern of each group can be configured by higher layer signaling (e.g., generated by processor(s) 510, transmitted via communication circuitry 520, received via transceiver circuitry 420, and processed by processor(s) 410). In such aspects, the BS (e.g., gNodeB) can indicate the group index via DCI (e.g., generated by processor(s) 510, transmitted via communication circuitry 520, received via transceiver circuitry 420, and processed by processor(s) 410).

Figure 12:
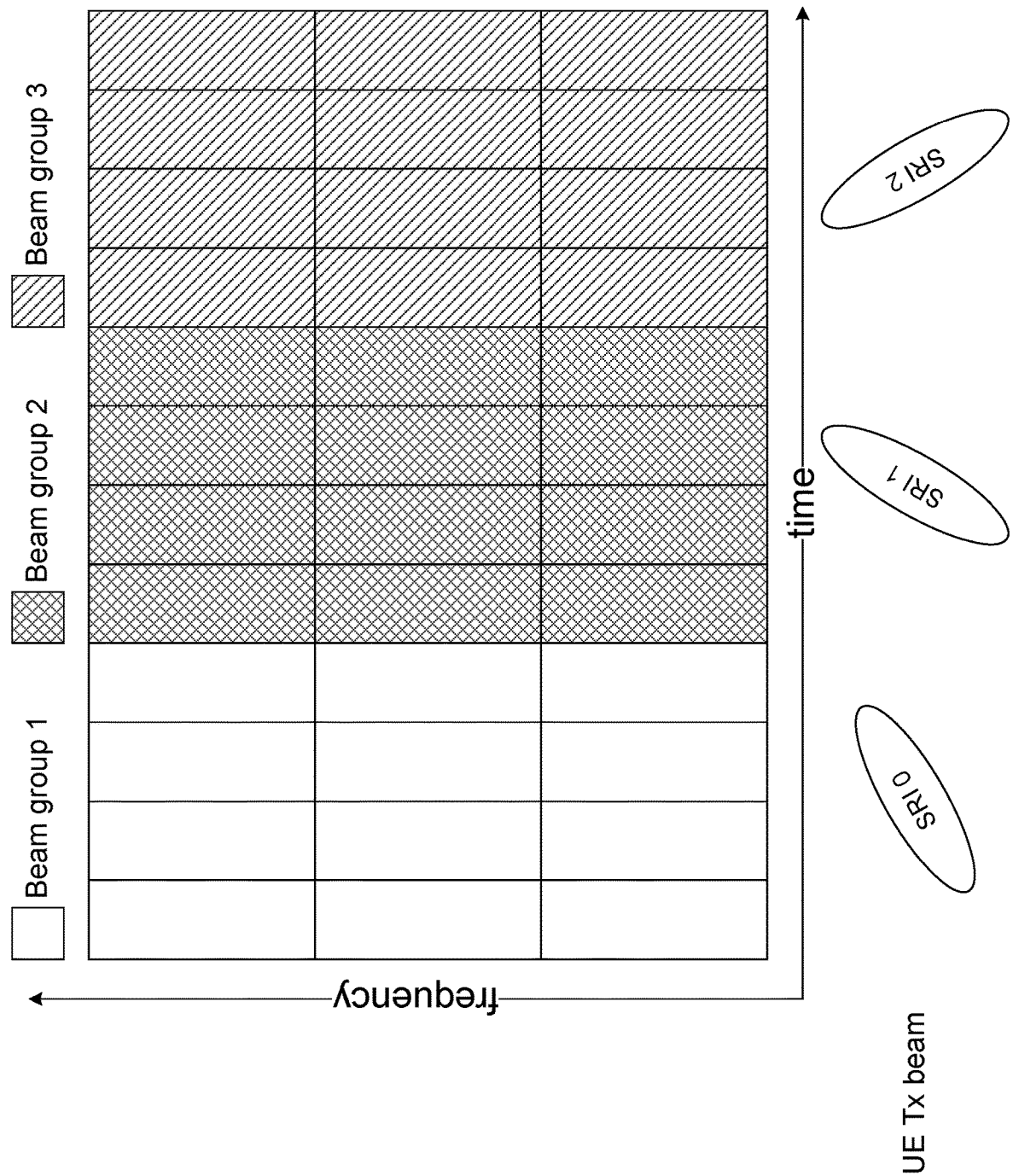
FIG. 12 is a diagram illustrating one example scenario that enables the measurement of multiple BPLs (Beam Pair Links), according to various aspects discussed herein.

Referring to FIG. 12, illustrated is a diagram showing one example scenario that enables the measurement of multiple BPLs, according to various aspects discussed herein. In various aspects, there can be some overlapping beams in each beam group and/or the time domain resource for each beam group can be consecutive or non-consecutive.

Enhancement of SR Channel

It can be advantageous for the BS (e.g., gNodeB) to perform the measurement (e.g., via processor(s) 510) based on a wideband SR channel transmission (e.g., generated by processor(s) 410, transmitted via transceiver circuitry 420, received via communication circuitry 520, and processed by processor(s) 510). However, with regard to overhead and transmission power limit, it can be inefficient to transmit (e.g., via transceiver circuitry 420) a full band SR channel (e.g., generated by processor(s) 410).

Figure 13:
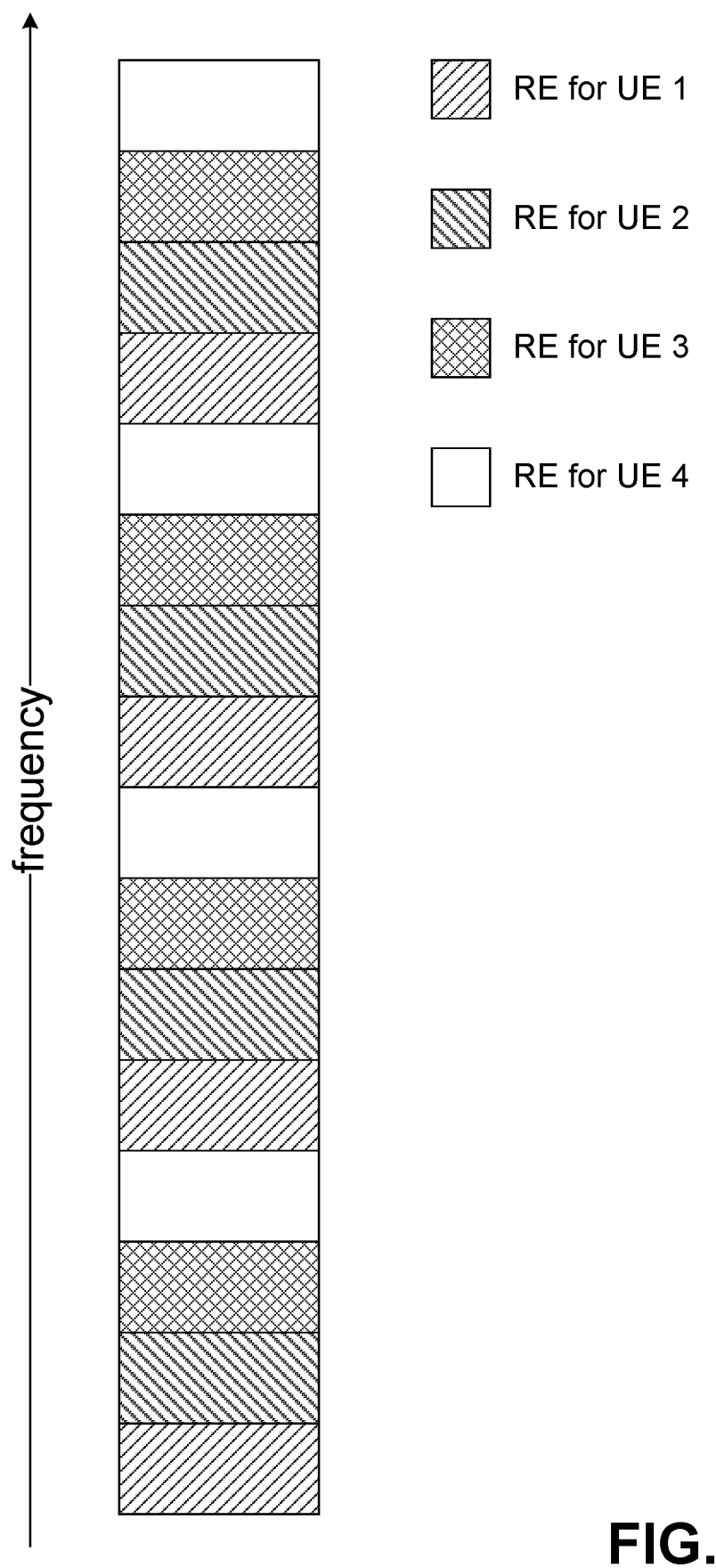
FIG. 13 is a diagram illustrating one example of a SR (Scheduling Request) channel multiplexing structure, according to various aspects discussed herein.

In various embodiments employing the second set of aspects, two or more different SR channels can be multiplexed in a FDM-based manner. In such aspects, different SR channels can use different comb offsets. Referring to FIG. 13, illustrated is a diagram showing one example of a SR channel multiplexing structure, according to various aspects discussed herein. A repetition factor (RPF) associated with the SR channels can be pre-defined or configured by higher layer signaling or DCI (e.g., generated by processor(s) 510, transmitted via communication circuitry 520, received via transceiver circuitry 420, and processed by processor(s) 410). Additionally, the comb offset for a UE can be configured by higher layer signaling or DCI (e.g., generated by processor(s) 510, transmitted via communication circuitry 520, received via transceiver circuitry 420, and processed by processor(s) 410).

Additional Embodiments

Figure 14:
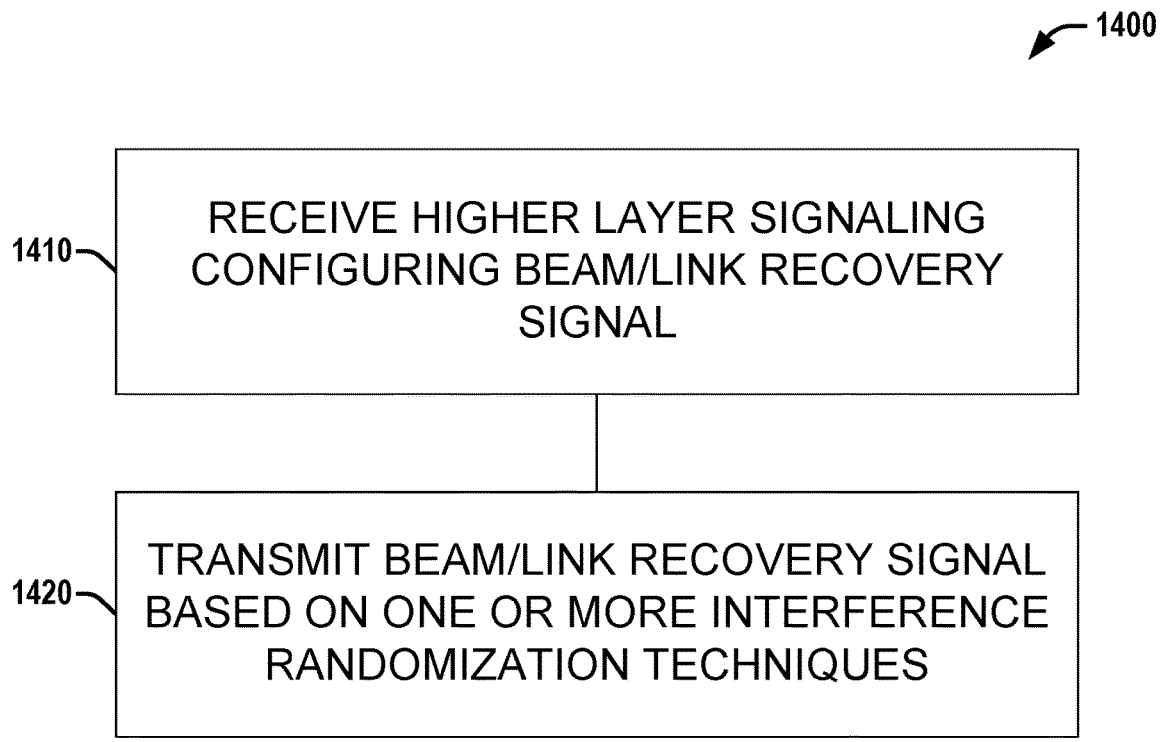
FIG. 14 is a flow diagram of an example method employable at a UE that facilitates interference randomization in connection with a beam/link recovery signal, according to various aspects discussed herein.

Referring to FIG. 14, illustrated is a flow diagram of an example method 1400 employable at a UE that facilitates interference randomization in connection with a beam/link recovery signal, according to various aspects discussed herein. In other aspects, a machine readable medium can store instructions associated with method 1400 that, when executed, can cause a UE to perform the acts of method 1400.

At 1410, higher layer signaling can be received that configures a beam/link recovery signal for a UE.

At 1420, the beam/link recovery signal can be transmitted, wherein the beam/link recovery signal and/or resources of the beam/link recovery signal are based on one or more interference randomization techniques.

Additionally or alternatively, method 1400 can include one or more other acts described herein in connection with various embodiments of system 400 implementing the first set of aspects.

Figure 15:
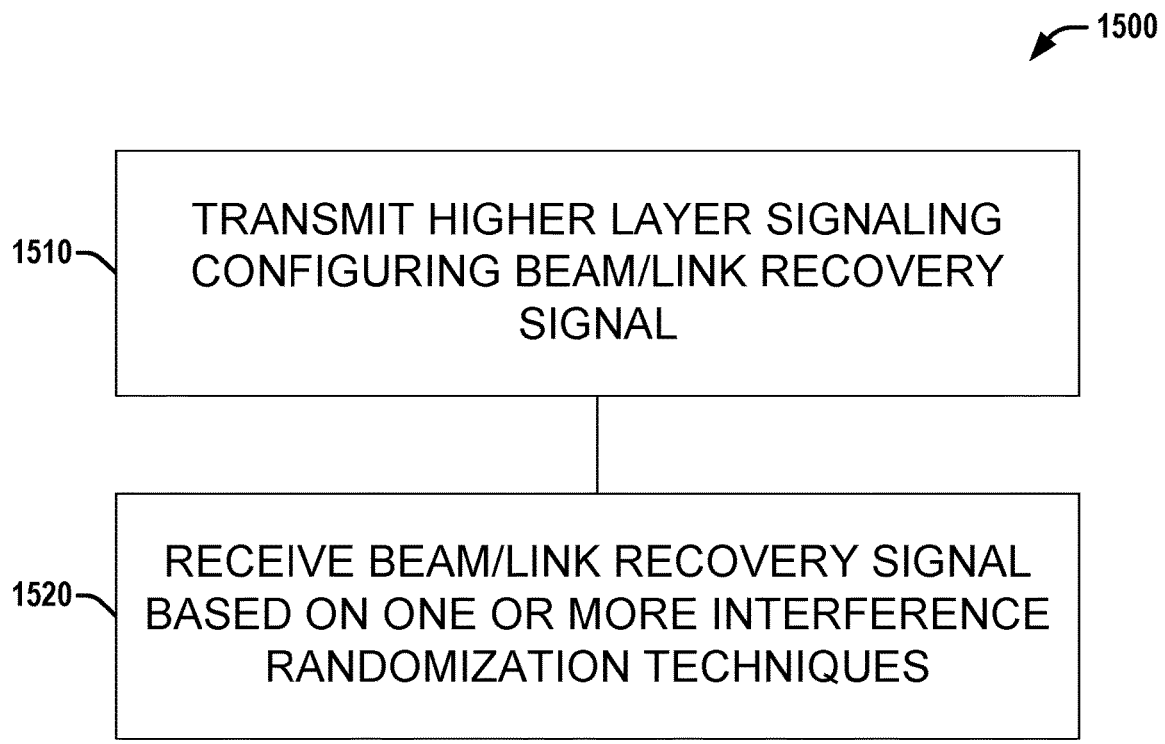
FIG. 15 is a flow diagram of an example method employable at a BS that facilitates interference randomization in connection with a beam/link recovery signal, according to various aspects discussed herein.

Referring to FIG. 15, illustrated is a flow diagram of an example method 1500 employable at a BS that facilitates interference randomization in connection with a beam/link recovery signal, according to various aspects discussed herein. In other aspects, a machine readable medium can store instructions associated with method 1500 that, when executed, can cause a BS (e.g., eNB, gNB, etc.) to perform the acts of method 1500.

At 1510, higher layer signaling can be transmitted that configures a beam/link recovery signal for a UE.

At 1520, the beam/link recovery signal can be received, wherein the beam/link recovery signal and/or resources of the beam/link recovery signal are based on one or more interference randomization techniques.

Additionally or alternatively, method 1100 can include one or more other acts described herein in connection with various embodiments of system 500 implementing the first set of aspects.

Figure 16:
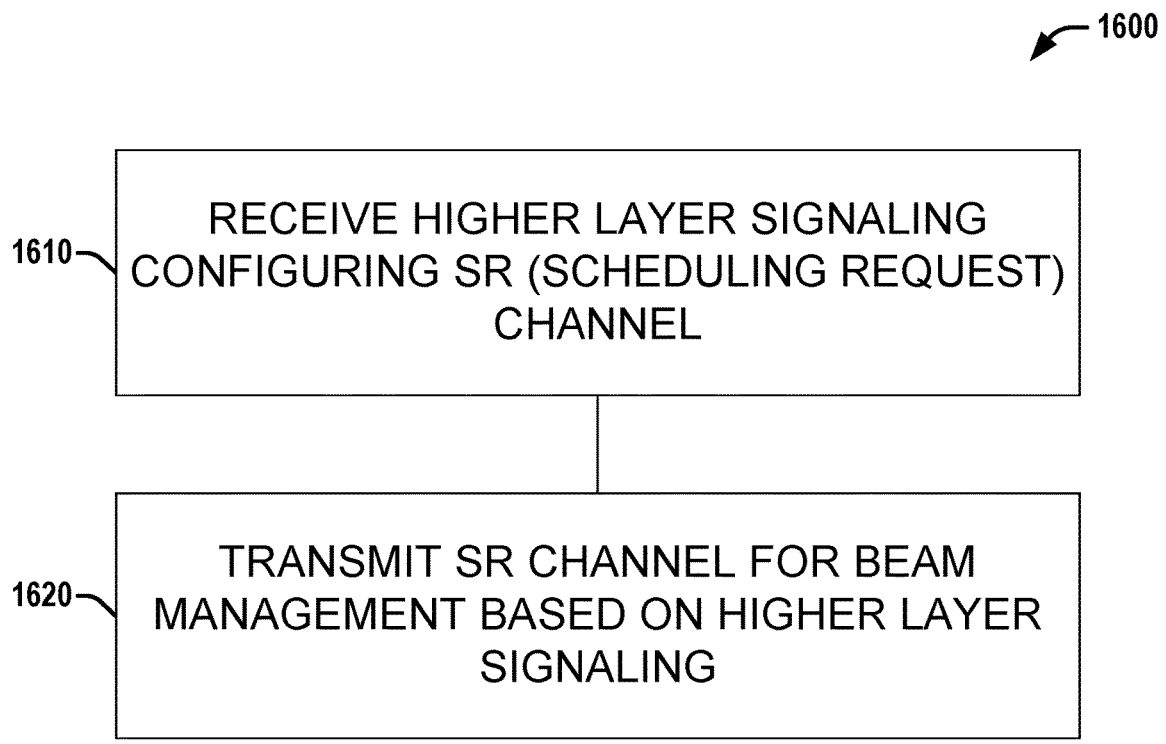
FIG. 16 is a flow diagram of an example method employable at a UE that facilitates transmission of a SR (Scheduling Request) channel for beam management having reduced overhead, according to various aspects discussed herein.

Referring to FIG. 16, illustrated is a flow diagram of an example method 1600 employable at a UE that facilitates transmission of a SR (Scheduling Request) channel for beam management having reduced overhead, according to various aspects discussed herein. In other aspects, a machine readable medium can store instructions associated with method 1600 that, when executed, can cause a UE to perform the acts of method 1600.

At 1610, higher layer signaling can be received that configures a SR (Scheduling Request) channel.

At 1620, the SR channel can be transmitted.

Additionally or alternatively, method 1600 can include one or more other acts described herein in connection with various embodiments of system 400 implementing the second set of aspects.

Figure 17:
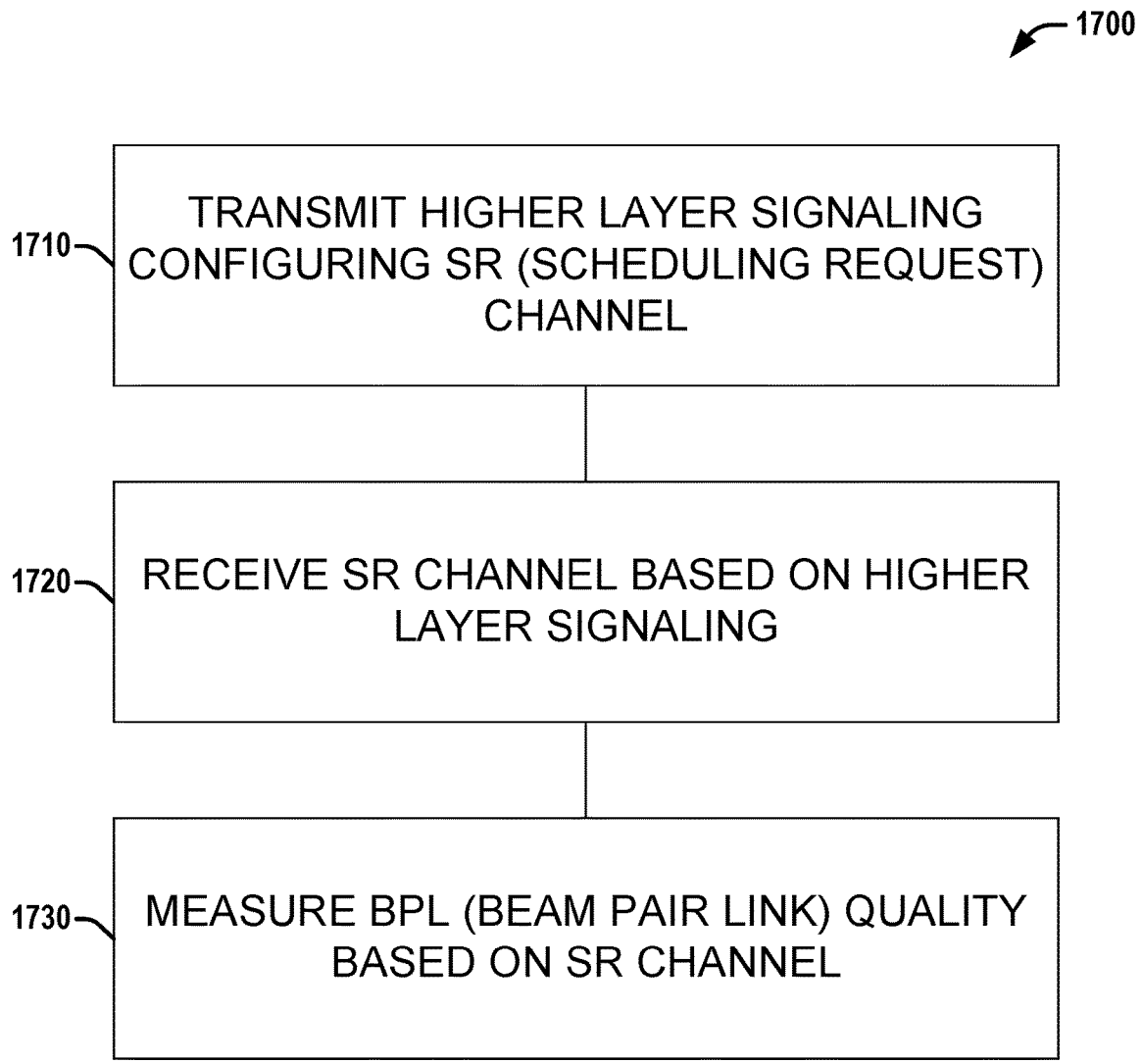
FIG. 17 is a flow diagram of an example method employable at a BS that facilitates reception of a SR (Scheduling Request) channel for beam management having reduced overhead, according to various aspects discussed herein.

Referring to FIG. 17, illustrated is a flow diagram of an example method 1700 employable at a BS that facilitates reception of a SR (Scheduling Request) channel for beam management having reduced overhead, according to various aspects discussed herein. In other aspects, a machine readable medium can store instructions associated with method 1700 that, when executed, can cause a BS (e.g., eNB, gNB, etc.) to perform the acts of method 1700.

At 1710, higher layer signaling can be transmitted that configures a SR (Scheduling Request) channel for a UE.

At 1720, the SR channel can be received.

At 1730, a BPL (Beam Pair Link) quality can be measured based on the received SR channel.

Additionally or alternatively, method 1700 can include one or more other acts described herein in connection with various embodiments of system 500 implementing the second set of aspects.

A first example embodiment employable in connection with the first set of aspects discussed herein can comprise User Equipment (UE) comprising circuitry configured to transmit a beam/link recovery signal with interference randomization.

In various aspects of the first example embodiment employable in connection with the first set of aspects, the base sequence of the beam/link recovery signal can be determined based at least in part on one or more of the cell ID, virtual cell ID, symbol/slot/subframe index, and/or frequency index.

In various aspects of the first example embodiment employable in connection with the first set of aspects, the UE can be configured (e.g., via configuration signaling generated by processor(s) 510, transmitted via communication circuitry 520, received via transceiver circuitry 420, and processed by processor(s) 410) with a starting cyclic shift, and the cyclic shift in each beam/link recovery signal can be determined based on the starting cyclic shift and one or more of a symbol index, a frequency resource index, a cell ID, and/or a virtual cell ID.

In various aspects of the first example embodiment employable in connection with the first set of aspects, frequency hopping can be used (e.g., by processor(s) 410 and transceiver circuitry 420) to transmit (e.g., via transceiver circuitry 420) the beam/link recovery signal via multiple resources. In various such aspects, the frequency hopping pattern can be pre-defined or determined by at least one or more following parameters: physical or virtual cell ID, the frequency resource for transmission of beam/link recovery signal in the first symbol, symbol/slot/frame index and UE ID.

In various aspects of the first example embodiment employable in connection with the first set of aspects, the BS (e.g., gNB) beams to receive the beam/link recovery signal can be divided into multiple groups or subsets (e.g., by processor(s) 510 and processor(s) 410). In various such aspects, the beam pattern for each group or subset can be pre-defined or configured via higher layer signaling (e.g., generated by processor(s) 510, transmitted via communication circuitry 520, received via transceiver circuitry 420, and processed by processor(s) 410). In various such aspects, the UE can transmit (e.g., via transceiver circuitry 420) the beam/link recovery signal (e.g., via transceiver circuitry 420) via some or all of the resources for one beam group or subset of a beam group.

In various aspects of the first example embodiment employable in connection with the first set of aspects, the beam/link recovery signal (e.g., generated by processor(s) 410) can be multiplexed with the PRACH used for initial access in a time division multiplexing manner and the subcarrier spacing for the beam/link recovery signal can be different from that of PRACH, which can be pre-defined or configured by higher layer signaling or Downlink Control Information (DCI) (e.g., generated by processor(s) 510, transmitted via communication circuitry 520, received via transceiver circuitry 420, and processed by processor(s) 410). In various such aspects, the symbol/slot/subframe used for transmission (e.g., via transceiver circuitry 420) of the beam/link recovery signal can be pre-defined, configured by higher layer signaling (e.g., generated by processor(s) 510, transmitted via communication circuitry 520, received via transceiver circuitry 420, and processed by processor(s) 410), and/or determined by cell ID or virtual cell ID.

A first example embodiment employable in connection with the second set of aspects discussed herein can comprise a User Equipment (UE) comprising circuitry configured to receive (e.g., via transceiver circuitry 420) control signaling (e.g., generated by processor(s) 510, transmitted via communication circuitry 520, received via transceiver circuitry 420, and processed by processor(s) 410) to indicate the transmission (e.g., via transceiver circuitry 420) of a Scheduling Request (SR) channel (e.g., generated by processor(s) 410) and can transmit (e.g., via transceiver circuitry 420) the SR channel (e.g., generated by processor(s) 410) for beam quality measurement (e.g., by processor(s) 510 and communication circuitry 520).

In various aspects of the first example embodiment employable in connection with the second set of aspects, the SR channel (e.g., generated by processor(s) 410) can comprise PRACH (e.g., generated by processor(s) 410, transmitted via transceiver circuitry 420, received via communication circuitry 520, and processed by processor(s) 510) and another reference signal or channel (e.g., generated by processor(s) 410, transmitted via transceiver circuitry 420, received via communication circuitry 520, and processed by processor(s) 510) used for beam recovery.

In various aspects of the first example embodiment employable in connection with the second set of aspects, the SR channel (e.g., generated by processor(s) 410) can be transmitted (e.g., via transceiver circuitry 420) periodically or in a semi-persistent scheduling manner, and the period and offset can be pre-defined or configured by higher layer signaling or Downlink Control Information (DCI) (e.g., generated by processor(s) 510, transmitted via communication circuitry 520, received via transceiver circuitry 420, and processed by processor(s) 410).

In various aspects of the first example embodiment employable in connection with the second set of aspects, the SR channel (e.g., generated by processor(s) 410) can be transmitted (e.g., generated by processor(s) 410) aperiodically and triggered by the DCI (e.g., generated by processor(s) 510, transmitted via communication circuitry 520, received via transceiver circuitry 420, and processed by processor(s) 410). In various such aspects, the DCI (e.g., generated by processor(s) 510, transmitted via communication circuitry 520, received via transceiver circuitry 420, and processed by processor(s) 410) can comprise one or more of the following indicators: period and offset (e.g., including slot or symbol offset), cyclic shift, comb offset index, frequency resource index and BS (e.g., gNodeB) beam group/subset index.

In various aspects of the first example embodiment employable in connection with the second set of aspects, the BS (e.g., gNodeB) can transmit (e.g., via communication circuitry 520) a response (e.g., generated by processor(s) 510) after receiving the SR channel (e.g., generated by processor(s) 410, transmitted via transceiver circuitry 420, received via communication circuitry 520, and processed by processor(s) 510). In various such aspects, the response (e.g., generated by processor(s) 510) can comprise the beam pair link (BPL) update information and/or Timing Advance (TA) for one or more BPLs.

In various aspects of the first example embodiment employable in connection with the second set of aspects, the SR channel resources allocated to a UE for Network (NW)-triggered SR signals and UE-initialized SR signals can be different (e.g., and orthogonal). Alternatively, in various aspects of the first example embodiment employable in connection with the second set of aspects, the SR channel resource allocated to one UE for Network (NW)-triggered SR signals and UE-initialized SR signals can be the same. In either of these aspects, when collision happens between NW triggered and UE initialized scheme, transmission (e.g., via transceiver circuitry 420) via one of these schemes (e.g., NW-triggered or UE-initialized) can be held off until a next transmission opportunity. In various such aspects, the scheme to be held can be pre-defined or can be configured by higher layer signaling or DCI (e.g., generated by processor(s) 510, transmitted via communication circuitry 520, received via transceiver circuitry 420, and processed by processor(s) 410).

In various aspects of the first example embodiment employable in connection with the second set of aspects, the SRI/BPL index or multiple SRI/BPL indexes which can be used to indicate the UE Tx beam for one or some of the SR channel signal transmissions (e.g., generated by processor(s) 410, transmitted via transceiver circuitry 420, received via communication circuitry 520, and processed by processor(s) 510) can be indicated by the DCI used to trigger the SR channel (e.g., generated by processor(s) 510, transmitted via communication circuitry 520, received via transceiver circuitry 420, and processed by processor(s) 410). In various aspects of the first example embodiment employable in connection with the second set of aspects, the SRI/BPL group index can be indicated by the DCI (e.g., generated by processor(s) 510, transmitted via communication circuitry 520, received via transceiver circuitry 420, and processed by processor(s) 410) and the pattern of the SRI/BPL in one group can be configured by higher layer signaling (e.g., generated by processor(s) 510, transmitted via communication circuitry 520, received via transceiver circuitry 420, and processed by processor(s) 410). In either of these aspects, the UE can use one Tx beam to transmit (e.g., via transceiver circuitry 420) the SR channel (e.g., generated by processor(s) 410) via the resources associated with a beam group, or the whole slot can be used (e.g., by processor(s) 410 and transceiver circuitry 420) for SR channel. In any of these aspects, the SR channel resource used for different beam group can be either continuous or discontinuous.

In various aspects of the first example embodiment employable in connection with the second set of aspects, multiple SR resource in one symbol can be multiplexed in one of a Frequency Division Multiplexing (FDM) manner or Code Division Multiplexing (CDM) manner. In various such aspects, the repetition factor and comb offset for one SR resource can be pre-defined or can be configured by higher layer signaling or DCI (e.g., generated by processor(s) 510, transmitted via communication circuitry 520, received via transceiver circuitry 420, and processed by processor(s) 410).

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed in a UE (User Equipment), comprising: a memory interface; and processing circuitry configured to: process higher layer signaling configuring a beam/link recovery signal; generate the beam/link recovery signal; map the beam/link recovery signal to an associated set of time and frequency resources; and send the higher layer signaling to a memory via the memory interface, wherein the processing circuitry is configured to one or more of generate the beam/link recovery signal or map the beam/link recovery signal based at least in part on at least one interference randomization technique.

Example 2 comprises the subject matter of any variation of example(s) 1, wherein the at least one interference randomization technique comprises sequence hopping, and wherein the processing circuitry is configured to generate the beam/link recovery signal based at least in part on the sequence hopping, wherein a base sequence of the beam/link recovery signal is based at least in part on one or more of a physical cell ID (Identifier), a virtual cell ID, a symbol index, a slot index, a subframe index, or a frequency index.

Example 3 comprises the subject matter of any variation of example(s) 1, wherein the at least one interference randomization technique comprises cyclic shift hopping, and wherein the processing circuitry is configured to generate the beam/link recovery signal based at least in part on the cyclic shift hopping, wherein a cyclic shift in the beam/link recovery is based at least in part on a starting cyclic shift configured via the higher layer signaling and one or more of a symbol index, a frequency resource index, a physical cell ID (Identifier), or a virtual cell ID.

Example 4 comprises the subject matter of any variation of example(s) 1, wherein the at least one interference randomization technique comprises frequency hopping according to a frequency hopping pattern, wherein the associated set of time and frequency resources comprises a plurality of frequency resources, and wherein the processing circuitry is configured to map the beam/link recovery signal to the plurality of frequency resources based at least in part on the frequency hopping pattern.

Example 5 comprises the subject matter of any variation of example(s) 4, wherein the frequency hopping pattern is predefined or wherein the processing circuitry is further configured to determine the frequency hopping pattern based at least in part on one or more of a physical cell ID (Identifier), a virtual cell ID, a frequency resource for a first symbol of the beam/link recovery signal, a symbol index, a slot index, a subframe index, or a UE ID of the UE.

Example 6 comprises the subject matter of any variation of example(s) 1-5, wherein the processing circuitry is further configured to: generate a PRACH (Physical Random Access Channel) preamble for a PRACH; and map the PRACH preamble to an additional set of time and frequency resources, wherein the PRACH preamble and the beam/link recovery signal are multiplexed in a TDM (Time Division Multiplexing)-based manner, wherein a subcarrier spacing of the PRACH is distinct from a subcarrier spacing of the beam/link recovery signal, and wherein the subcarrier spacing of the beam/link recovery signal is one of predefined, configured via the higher layer signaling, or configured via DCI (Downlink Control Information).

Example 7 comprises the subject matter of any variation of example(s) 6, wherein one of: time resources of the set of time and frequency resources are predefined, time resources of the set of time and frequency resources are configured via the higher layer signaling, or the processing circuitry is further configured to determine the time resources of the set of time and frequency resources based at least in part on one or more of a physical cell ID (Identifier) or a virtual cell ID.

Example 8 is an apparatus configured to be employed in a gNB (next generation Node B), comprising: a memory interface; and processing circuitry configured to: generate higher layer signaling that configures an associated beam/link recovery signal for each UE (User Equipment) of one or more UEs; process a first beam/link recovery signal from a first set of time and frequency resources, wherein at least one of a sequence of the first beam/link recovery signal, a coding of the beam/link recovery signal, or frequency resources of the first set of time and frequency resources is based on one or more interference randomization techniques; determine a first UE of the one or more UEs that is associated with the first beam/link recovery signal; and send an indicator associated with the first UE to a memory via the memory interface.

Example 9 comprises the subject matter of any variation of example(s) 8, wherein the associated beam/link recovery signals for the one or more UEs are associated with a plurality of gNB beams, wherein each gNB beam of the plurality of gNB beams is in an associated beam group of a plurality of beam groups.

Example 10 comprises the subject matter of any variation of example(s) 9, wherein a beam pattern for each beam group of the plurality of beam groups is one of predefined or configured via the higher layer signaling.

Example 11 comprises the subject matter of any variation of example(s) 9, wherein each beam group of the plurality of beam groups has an associated set of time and frequency resources, and wherein the first set of time and frequency resources is at least a subset of the associated set of time and frequency resources of a first beam group of the plurality of beam groups.

Example 12 comprises the subject matter of any variation of example(s) 8-11, wherein the one or more interference randomization techniques comprise at least one of frequency hopping, sequence hopping, or cyclic shift hopping.

Example 13 is an apparatus configured to be employed in a UE (User Equipment), comprising: a memory interface; and processing circuitry configured to: process higher layer signaling configuring a SR (Scheduling Request) channel, wherein the SR channel comprises one or more of a PRACH (Physical Random Access Channel), a beam recovery channel or RS (Reference Signal), or an associated PUCCH (Physical Uplink Control Channel) format; generate the SR channel based at least in part on the higher layer signaling; map the SR channel to an associated set of time and frequency resources; and send the higher layer signaling to a memory via the memory interface.

Example 14 comprises the subject matter of any variation of example(s) 13, wherein the SR channel comprises the PRACH and the beam recovery channel or RS.

Example 15 comprises the subject matter of any variation of example(s) 13, wherein the processing circuitry is further configured to generated the SR channel one of periodically or based on SPS (Semi-Persistent Scheduling), wherein the SR channel is generated based on a period and a time offset, wherein the period and the time offset are one of predefined or configured via the higher layer signaling.

Example 16 comprises the subject matter of any variation of example(s) 13, wherein the processing circuitry is further configured to decode a DCI (Downlink Control Information) message triggering the SR channel, wherein the processing circuitry is configured to generate the SR channel aperiodically in response to the DCI message.

Example 17 comprises the subject matter of any variation of example(s) 16, wherein the DCI message indicates one or more of the following associated with the SR channel: a period, a slot offset, a symbol offset, a cyclic shift, a comb offset index, a frequency resource index, or a gNB (next Generation NodeB) beam group index.

Example 18 comprises the subject matter of any variation of example(s) 16, wherein the processing circuitry is further configured to select a UE beam for the SR channel, wherein the UE beam has an associated SRI (SRS (Sounding Reference Signal) Resource Index) or an associated BPL (Beam Pair Link) index, and wherein the DCI indicates the associated SRI or the associated BPL index.

Example 19 comprises the subject matter of any variation of example(s) 16, wherein the processing circuitry is further configured to select a UE beam for the SR channel, wherein the UE beam has an associated SRI (SRS (Sounding Reference Signal) Resource Index) or an associated BPL (Beam Pair Link) index, wherein the DCI indicates an SRI group index comprising the associated SRI or a BPL group index comprising the associated BPL index, wherein the processing circuitry is configured to select the UE beam based on a pattern configured via the higher layer signaling associated with the SRI group index or the BPL group index.

Example 20 comprises the subject matter of any variation of example(s) 18-19, wherein the associated set of time and frequency resources comprise one of a slot or resources associated with a beam group comprising the UE beam.

Example 21 comprises the subject matter of any variation of example(s) 18-19, wherein the associated set of time and frequency resources is one of continuous or discontinuous.

Example 22 comprises the subject matter of any variation of example(s) 13, wherein the higher layer signaling configures a first set of resources associated with a NW (Network)-triggered SR channel and a second set of resources associated with a UE-initialized SR channel, wherein the first set of resources is orthogonal to the second set of resources, wherein the SR channel is one of the NW-triggered SR channel or the UE-initialized SR channel, and wherein one of the first set of resources or the second set of resources comprises the set of time and frequency resources.

Example 23 comprises the subject matter of any variation of example(s) 13, wherein the higher layer signaling configures a first set of resources associated with a NW (Network)-triggered SR channel and a second set of resources associated with a UE-initialized SR channel, wherein the first set of resources is the second set of resources, wherein the SR channel is one of the NW-triggered SR channel or the UE-initialized SR channel, and wherein the first set of resources comprises the set of time and frequency resources.

Example 24 comprises the subject matter of any variation of example(s) 22-23, wherein the processing circuitry is further configured to: determine a potential collision between the NW-triggered SR channel and the UE-initialized SR channel; determine a selected SR channel of the NW-triggered SR channel and the UE-initialized, wherein the SR channel is the selected SR channel; and delay a non-selected SR channel of the NW-triggered SR channel and the UE-initialized.

Example 25 comprises the subject matter of any variation of example(s) 24, wherein the selected channel is one of predefined, configured via the higher layer signaling, or configured via a DCI (Downlink Control Information) message.

Example 26 comprises the subject matter of any variation of example(s) 13-17, wherein the associated set of time and frequency resources are a first set of SR resources of a plurality of sets of SR resources, wherein the plurality of sets of SR resources are multiplexed in one of a FDM (Frequency Division Multiplexing)-based manner or a CDM (Code Division Multiplexing)-based manner.

Example 27 comprises the subject matter of any variation of example(s) 26, wherein a repetition factor and a comb offset for the first set of SR resources are configured via one of the higher layer signaling or a DCI (Downlink Control Information) message.

Example 28 is an apparatus configured to be employed in a UE (User Equipment), comprising: a memory interface; and processing circuitry configured to: generate higher layer signaling configuring a SR (Scheduling Request) channel for an associated BPL (Beam Pair Link), wherein the SR channel comprises one or more of a PRACH (Physical Random Access Channel), a beam recovery channel or RS (Reference Signal), or an associated PUCCH (Physical Uplink Control Channel) format; process the SR channel; measure an associated BPL (Beam Pair Link) quality measurement for the associated BPL based on the processed SR channel; and send the associated BPL quality measurement to a memory via the memory interface.

Example 29 comprises the subject matter of any variation of example(s) 28, wherein the processing circuitry is further configured to generate a response to the SR channel.

Example 30 comprises the subject matter of any variation of example(s) 29, wherein the response comprises, for each BPL of a set of BPLs comprising the associated BPL, one or more of BPL update information for that BPL or a TA (Timing Advance) for that BPL.

Example 31 comprises an apparatus comprising means for executing any of the described operations of examples 1-30.

Example 32 comprises a machine readable medium that stores instructions for execution by a processor to perform any of the described operations of examples 1-30.

Example 33 comprises an apparatus comprising: a memory interface; and processing circuitry configured to: perform any of the described operations of examples 1-30.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An apparatus configured to be employed in a UE (User Equipment), comprising:
a memory interface; and
processing circuitry configured to:
   process higher layer signaling configuring a beam/link recovery signal;
   generate the beam/link recovery signal;
   map the beam/link recovery signal to an associated set of time and frequency resources; and
   send the higher layer signaling to a memory via the memory interface,
   wherein the processing circuitry is configured to one or more of generate the beam/link recovery signal or map the beam/link recovery signal based at least in part on at least one interference randomization technique.

2. The apparatus of claim 1, wherein the at least one interference randomization technique comprises sequence hopping, and wherein the processing circuitry is configured to generate the beam/link recovery signal based at least in part on the sequence hopping, wherein a base sequence of the beam/link recovery signal is based at least in part on one or more of a physical cell ID (Identifier), a virtual cell ID, a symbol index, a slot index, a subframe index, or a frequency index.

3. The apparatus of claim 1, wherein the at least one interference randomization technique comprises cyclic shift hopping, and wherein the processing circuitry is configured to generate the beam/link recovery signal based at least in part on the cyclic shift hopping, wherein a cyclic shift in the beam/link recovery signal is based at least in part on a starting cyclic shift configured via the higher layer signaling and one or more of a symbol index, a frequency resource index, a physical cell ID (Identifier), or a virtual cell ID.

4. The apparatus of claim 1, wherein the at least one interference randomization technique comprises frequency hopping according to a frequency hopping pattern, wherein the associated set of time and frequency resources comprises a plurality of frequency resources, and wherein the processing circuitry is configured to map the beam/link recovery signal to the plurality of frequency resources based at least in part on the frequency hopping pattern.

5. The apparatus of claim 4, wherein the frequency hopping pattern is predefined or wherein the processing circuitry is further configured to determine the frequency hopping pattern based at least in part on one or more of a physical cell ID (Identifier), a virtual cell ID, a frequency resource for a first symbol of the beam/link recovery signal, a symbol index, a slot index, a subframe index, or a UE ID of the UE.

6. The apparatus of claim 1, wherein the processing circuitry is further configured to:
   generate a PRACH (Physical Random Access Channel) preamble for a PRACH; and
   map the PRACH preamble to an additional set of time and frequency resources,
   wherein the PRACH preamble and the beam/link recovery signal are multiplexed in a TDM (Time Division Multiplexing)-based manner, wherein a subcarrier spacing of the PRACH is distinct from a subcarrier spacing of the beam/link recovery signal, and wherein the subcarrier spacing of the beam/link recovery signal is one of predefined, configured via the higher layer signaling, or configured via DCI (Downlink Control Information).

7. The apparatus of claim 6, wherein one of: time resources of the set of time and frequency resources are predefined, time resources of the set of time and frequency resources are configured via the higher layer signaling, or the processing circuitry is further configured to determine the time resources of the set of time and frequency resources based at least in part on one or more of a physical cell ID (Identifier) or a virtual cell ID.

8. An apparatus configured to be employed in a gNB (next generation Node B), comprising:
a memory interface; and
processing circuitry configured to:
   generate higher layer signaling that configures an associated beam/link recovery signal for each UE (User Equipment) of one or more UEs;
   process a first beam/link recovery signal from a first set of time and frequency resources, wherein at least one of a sequence of the first beam/link recovery signal, a coding of the beam/link recovery signal, or frequency resources of the first set of time and frequency resources is based on one or more interference randomization techniques;
   determine a first UE of the one or more UEs that is associated with the first beam/link recovery signal; and
   send an indicator associated with the first UE to a memory via the memory interface.

9. The apparatus of claim 8, wherein the beam/link recovery signals for the one or more UEs are associated with a plurality of gNB beams, wherein each gNB beam of the plurality of gNB beams is in an associated beam group of a plurality of beam groups.

10. The apparatus of claim 9, wherein a beam pattern for each beam group of the plurality of beam groups is one of predefined or configured via the higher layer signaling.

11. The apparatus of claim 9, wherein each beam group of the plurality of beam groups has an associated set of time and frequency resources, and wherein the first set of time and frequency resources is at least a subset of the associated set of time and frequency resources of a first beam group of the plurality of beam groups.

12. The apparatus of claim 8, wherein the one or more interference randomization techniques comprise at least one of frequency hopping, sequence hopping, or cyclic shift hopping.

* * * * *